United States Patent
Popat et al.

(10) Patent No.: US 6,678,415 B1
(45) Date of Patent: Jan. 13, 2004

(54) DOCUMENT IMAGE DECODING USING AN INTEGRATED STOCHASTIC LANGUAGE MODEL

(75) Inventors: Ashok C. Popat, San Carlos, CA (US); Dan S. Bloomberg, Palo Alto, CA (US); Daniel H. Greene, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/570,730

(22) Filed: May 12, 2000

(51) Int. Cl.[7] .............................. G06K 9/62; G06K 9/72
(52) U.S. Cl. ........................ 382/226; 382/228; 382/229
(58) Field of Search .................................. 382/173, 176, 382/209, 217, 218, 224, 226, 228, 229, 186, 161; 706/20, 21, 15; 703/2; 704/1

(56) References Cited

U.S. PATENT DOCUMENTS

| | | | |
|---|---|---|---|
| 5,020,112 A | 5/1991 | Chow | 382/37 |
| 5,199,077 A | 3/1993 | Wilcox et al. | 381/43 |
| 5,321,773 A | 6/1994 | Kopec et al. | 382/30 |
| 5,526,444 A | 6/1996 | Kopec et al. | 382/233 |
| 5,594,809 A * | 1/1997 | Kopec et al. | 382/161 |
| 5,689,620 A | 11/1997 | Kopec et al. | 395/20 |
| 5,706,364 A | 1/1998 | Kopec et al. | 382/159 |
| 5,875,256 A * | 2/1999 | Brown et al. | 382/186 |
| 5,883,986 A | 3/1999 | Kopec et al. | 382/310 |
| 5,933,525 A * | 8/1999 | Makhoul et al. | 382/186 |
| 6,047,251 A * | 4/2000 | Pon et al. | 704/1 |
| 6,112,021 A * | 8/2000 | Brand | 703/2 |
| 6,449,603 B1 * | 9/2002 | Hunter | 706/15 |

OTHER PUBLICATIONS

C. B. Bose and S. Kuo, "Connected and Degraded Text Recognition Using A Hidden Markov Model," *11th International Conference on Pattern Recognition*, The Hague Netherlands, Sep. 1992.

(List continued on next page.)

*Primary Examiner*—Jon Chang
*Assistant Examiner*—Brian Le
(74) *Attorney, Agent, or Firm*—Nola M. McBain

(57) ABSTRACT

A text recognition system represents the decoded message of a document image as a path through an image network. A method for integrating a language model into the network selectively expands the network to accommodate the language model only for certain ones of the paths in the network, effectively managing the memory storage requirements and computational complexities of integrating the language model efficiently into the network. The language model generates probability distributions indicating the probability of a certain character occurring in a string, given one or more previous characters in the string. Selectively expanding the image network is achieved by initially using upper bounds on the language model probabilities on the branches of an unexpanded image network. A best path search operation is then performed to determine an estimated best path through the image network using these upper bound scores. After decoding, only the nodes on the estimated best path are expanded with new nodes and with branches incoming to the new nodes that accommodate new language model scores reflecting actual character histories in place of the upper bound scores. Decoding and selectively expanding the image network are repeated until the final output transcription of the text image has been produced.

20 Claims, 8 Drawing Sheets

OTHER PUBLICATIONS

F. Chen and L. Wilcox, "Wordspotting In Scanned Images Using Hidden Markov Models", *1993 IEEE International Conference on Acoustics, Speech and Signal Processing*, Minneapolis, Minn., Apr. 27–30, 1993.

P. Chou and G. Kopec, "A Stochastic Attribute Grammer Model Of Document Production And Its Use In Document Recognition," *First International Workshop on Principles of Document Processing*, Washington, D.C., Oct. 21–23, 1992.

G. Kopec, "Row–Major Scheduling Of Image Decoders," *Technical Report P92–0006 (EDL–92–5)*, Xerox Palo Alto Research Center, Palo Alto, CA Jun. 1992.

G. Kopec and P. Chou, Document Image Decoding Using Markov Source Models, *IEEE Transactions on Pattern Analysis and Machine Intelligence*, vol. 16, No. 6, Jun. 1994, pp. 602–617.

A. Kam and G. Kopec, "Document Image Decoding By Heuristic Search," *IEEE Transactions on Pattern Analysis and Machine Intelligence*, vol. 18, No. 9, Sep. 1996, pp. 945–950.

F. R. Chen, D. S. Bloomberg and L. D. Wilcox, "Spotting Phrases In Lines Of Imaged Text", *Proceedings of SPIE, Document Recognition II*, vol. 2422, Feb. 1995, pp. 256–269.

E. M Riseman and A. R. Hanson, "A Contextual Postprocessing System for Error Correction Using Binary N–Grams," *IEEE Transactions on Computers*, May 1974, pp. 480–493.

J. R. Ulman, "A Binary n–Gram Technique for Automatic Correction of Substitution, Deletion, Insertion and Reversal Erros in Words," *The computer Journal*, 1977, pp. 141–147.

J. J. Hull and S. N. Srihari, "Experiments in Text Recognition with Binary n–Gram and Viterbi Algorithms," *IEEE Transactions on Patter Analysis and Machine Intelligence*, Sep. 1992, pp. 520–530.

\* cited by examiner

DOCUMENT IMAGE DECODING USING AN INTEGRATED STOCHASTIC LANGUAGE MODEL

CROSS-REFERENCES TO OTHER APPLICATIONS

The subject matter disclosed in this application is related to subject matter disclosed in concurrently filed, commonly-assigned U.S. patent application Ser. No. 09/464,381 filed on Dec. 16, 1999 entitled "Document Image Decoding Using Text Line Column-Based Heuristic Scoring", now U.S. Pat. No. 6,360,951 which is referred to as "the concurrently filed Heuristic Scoring disclosure," for ease of reference throughout the discussion below. The subject matter disclosed in this application is also related to subject matter disclosed in concurrently filed, commonly-assigned U.S. patent application Ser. No. 09/569,531, filed May 12, 2000 entitled "Dynamic Programming Operation With Skip Mode For Text Line Image Decoding;" this patent application is referred to as "the concurrently filed Dynamic Programming Skip Mode disclosure" in the discussion that follows. These disclosures are incorporated by reference herein for all that each teaches as if set out in full.

The subject matter disclosed in this application is also related to subject matter disclosed in U.S. Pat. No. 5,321,773, entitled "Image Recognition Method Using Finite State Networks," in U.S. Pat. No. 5,526,444, entitled "Document Image Decoding Using Modified Branch-And-Bound Methods" and in U.S. Pat. No. 5,883,986 entitled "Method and System for Automatic Transcription Correction." The disclosures of U.S. Pat. Nos. 5,321,773 and 5,526,444 are incorporated by reference herein for all that each teaches as if set out in full.

BACKGROUND OF THE INVENTION

The present invention relates generally to image decoding and image recognition techniques, and in particular to such techniques using stochastic finite state networks such as Markov sources. In particular, the present invention provides a technique for efficiently integrating a language model into a stochastic finite state network representation of a text line image, for use in text line image decoding.

Stochastic grammars have been applied to document image recognition problems and to text recognition in particular. See, for example, the work of Bose and Kuo, identified in reference [1] which uses hidden Markov models (HMMs) for word or text line recognition. Bracketed numerals identify referenced publications listed in the Appendix of Referenced Documents. See also U.S. Pat. No. 5,020,112, issued to P. A. Chou and entitled "Image Recognition Using Two-Dimensional Stochastic Grammars."

U.S. Pat. No. 5,321,773 (hereafter the '773 DID patent), issued to Kopec and Chou, discloses a document recognition technique known as Document Image Decoding (hereafter, DID) that is based on classical communication theory. This work is further discussed in references [2], [3] and [3]. The DID model 800, illustrated in FIG. 14, includes a stochastic message source 810, an imager 811, a channel 812 and a decoder 813. The stochastic message source 810 selects a finite string M from a set of candidate strings according to a prior probability distribution. The imager 811 converts the message into an ideal binary image Q. The channel 812 maps the ideal image into an observed image Z by introducing distortions due to printing and scanning, such as skew, blur and additive noise. Finally, the decoder 813 receives observed image Z and produces an estimate $\hat{M}$ of the original message according to a maximum a posteriori (MAP) decision criterion. Note that in the context of DID, the estimate $\hat{M}$ of the original message is often referred to as the transcription of observed image Z.

The structure of the message source and imager is captured formally by combining their functions into a single composite image source 815, as shown by the dotted lines in FIG. 14. Image source 815 models image generation using a Markov source. A Markov source is a stochastic finite-state automaton that describes the spatial layout and image components that occur in a particular class of document images as a regular grammar, representing these spatial layout and image components as a finite state network. A general Markov source model 820 is depicted in FIG. 15 and comprises a finite state network made up of a set of nodes and a set of directed transitions into each node. There are two distinguished nodes 822 and 824 that indicate initial and final states, respectively. A directed transition t between any two predecessor ($L_t$) and successor ($R_t$) states in the network of FIG. 15 has associated with it a 4-tuple of attributes 826 comprising a character template, Q, a label or message string, m, a transitional probability, $\alpha$, and a two-dimensional integer vector displacement, $\Delta$. The displacement indicates a horizontal distance that is the set width of the template. The set width of a template specifies the horizontal (x-direction) distance on the text line that the template associated with this transition occupies in the image.

Decoding a document image using the DID system involves the search for the path through the finite state network representing the observed image document that is the most likely path that would have produced the observed image. The '773 DID patent discloses that decoding involves finding the best (MAP) path through a three-dimensional (3D) decoding trellis data structure indexed by the nodes of the model and the coordinates of the image plane, starting with the initial state and proceeding to the final state. Decoding is accomplished by a dynamic programming operation, typically implemented as a Viterbi algorithm. The dynamic programming operation involves computing the probability that the template of a transition corresponds to a region of the image to be decoded in the vicinity of the image point. This template-image probability is represented by a template-image matching score that indicates a measurement of the match between a particular template and the image region at the image point. Branches in the decoding trellis are labeled with the matching scores. A general description of the implementation of the Viterbi algorithm in the context of Document Image Decoding is omitted here and is provided in the discussion of an implementation of the present invention in the Detailed Description below.

U.S. Pat. No. 5,526,444 (hereafter, the '444 ICP patent) issued to Kopec, Kam and Chou and entitled "Document Image Decoding Using Modified Branch-And-Bound Methods," discloses several techniques for improving the computational efficiency of decoding using the DID system. The '444 ICP patent disclosed the use of a class of Markov source models called separable Markov models. When a 2D page layout is defined as a separable Markov source model, it may be factored into a product of 1 D models that represent horizontal and vertical structure, respectively. The '444 ICP patent further discloses that decoding with a separable model involves finding the best path through the 2D decoding trellis defined by the nodes of the top-level model, some of which are position-constrained, and the vertical dimension of the image. The computational effect of a position constraint is to restrict the decoding lattice for a node to a subset of the image plane, providing significant computational savings when used with standard Viterbi decoding.

The '444 ICP patent further discloses the use of a recursive Markov source. A recursive source is a collection of named sub-sources each of which is similar to a constrained Markov source except that it may include an additional type of transition. A recursive transition is labeled with a transition probability and the name of one of the Markov sub-sources. The interpretation of a recursive transition is that it represents a copy of the named sub-source. Thus, some of the transitions of the top-level vertical model are labeled with horizontal models. One aspect of each of the horizontal models is that every complete path through the model starts at a fixed horizontal position and ends at a fixed horizontal position, effectively reducing decoding to a one-dimensional search for the best path. A second aspect is that the vertical displacement of every complete path in the model is a constant that is independent of the vertical starting position of the path. Thus, the horizontal models describe areas of the image plane that are text lines, and the top-level vertical model with its nodes that are constrained by position defines which rows of pixels in the 2D image are to be considered as potential text lines. The match score for each branch is computed by running the horizontal model (i.e., performing the Viterbi procedure) along the appropriate row of the image. The overall decoding time for a separable model is dominated by the time required to run the horizontal models, that is, to decode individual text lines.

In conjunction with the use of separable models, the '444 ICP patent also discloses a heuristic algorithm called the Iterated Complete Path (hereafter, ICP) algorithm that fits into the framework of the Viterbi decoding procedure utilized by DID but improves on that procedure by focusing on a way to reduce the time required to decode each of the horizontal models, or lines of text. The ICP algorithm disclosed in the '444 ICP patent is an informed best-first search algorithm that is similar to heuristic search and optimization techniques such as branch-and-bound and A* algorithms. During decoding, ICP causes the running of a horizontal model (i.e., computes the actual template-image matching scores) for only a reduced set of transitions into each node, the reduced number of transitions being substantially smaller than the number of all possible transitions into the node. ICP reduces the number of times the horizontal models are run by replacing full Viterbi decoding of most of the horizontal rows of pixels with the computation of a simple upper bound on the score for that row. This upper bound score is developed from an upper bound function. ICP includes two types of parameterized upper bound functions. Additional information about the ICP best-first search algorithm may also be found in reference [5].

In the '444 ICP patent, the use of a finite state model defined as a constrained and recursive Markov source combined with the ICP algorithm allow for particular transitions to be abandoned as not likely to contain the best path, thereby reducing computation time. Full decoding using the longer computation process of computing the template-image matching scores for a full horizontal line is carried out only over a much smaller number of possible transitions, in regions of the image that are expected to include text lines. The reader is directed to the '444 ICP patent for more details about the heuristic scores disclosed therein. In particular, see the discussion in the '444 ICP patent beginning at col. 16 and accompanying FIG. 7 therein, and refer to FIG. 23 for the pseudo code of the procedure that computes the weighted horizontal pixel projection heuristic.

U.S. Pat. No. 5,883,986 (hereafter, the '986 Error Correction patent) issued to Kopec, Chou and Niles entitled "Method and System for Automatic Transcription Correction," extended the utility of the DID system to correcting errors in transcriptions. The '986 Error Correction patent discloses a method and system for automatically correcting an errorful transcription produced as the output of a text recognition operation. The method and system make use of the stochastic finite state network model of document images. Error correction is accomplished by first modifying the image model using the errorful transcription, and then performing a second recognition operation on the document image using the modified image model. The second recognition operation provides a second transcription having fewer errors than the original, input transcription. The method and system disclosed in the '986 Error Correction patent may be used as an automatic post-recognition correction operation following an initial OCR operation, eliminating the need for manual error correction.

The '986 Error Correction patent disclosure describes two methods by which to modify the image model. The second of these modifications is particularly relevant to the subject invention, and involves the use of a language model. Language modeling used in OCR and in post-OCR processing operations is well known. See, for example, references [6], [7] and [8]. Language models provide a priori, externally supplied and explicit information about the expected sequence of character images in the image being decoded. The premise for the use of language models in OCR systems is that transcription errors can be avoided by choosing as the correct transcription sequences of characters that actually occur in the language used in the image being decoded instead of other sequences of characters that do not occur. A language model is, in effect, a soft measure of the validity of a certain transcription. A spelling corrector that ensures that each word in the transcription is a correctly spelled word from some dictionary is a simple form of language modeling. Language models may be used during the recognition operation, or as part of a post-processing correction technique. Contextual post-processing error correction techniques make use of language structure extracted from dictionary words and represented as N-grams, or N-character subsets of words. More advanced forms of language modeling include examining the parts of speech, sentence syntax, etc., to ensure that the transcription correctly follows the grammar of the language the document is written in.

In the '986 Error Correction patent, the original errorful transcription is used to construct an N-gram language model that is specific to the language that actually occurs in the document image being decoded. The language model is then incorporated into the stochastic finite network representation of the image. Disclosure related to the language model is found at col. 53–57 in the discussion accompanying FIGS. 23–36. In particular, the construction of a binary N-gram (bigram) model and the incorporation of the bigram model into the Markov image source model are described. The effect of incorporating the language model is to constrain or influence the decoding operation to choose a sequence of characters that is consistent with character sequences allowed by the language model, even when template-image matching scores might produce a different decoding result. Some percentage of the errors in the original errorful transcription should be eliminated using the stochastic finite state network representation of the image as modified by the language model.

The powerful flexibility offered by the DID system is limited in actual use by the time complexity involved in the decoding process. The size and complexity of the image, as defined by the model (i.e., the number of transitions) and the number of templates to be matched, are major factors in computation time. Indeed, the time complexity of decoding using a two-dimensional image source model and a dynamic programming operation, is $O(\|\beta\| \times H \times W)$, where $\|\beta\|$ is the number of transitions in the source model and H and w are the image height and width, respectively, in pixels. Incorporating a language model into the decoding operation significantly adds to decoding complexity. More generally, the direct incorporation of an $m^{th}$ order Markov process language model (where m>0) causes an exponential explosion in the number of states in the image model. An N-gram language model corresponds to an $m^{th}$ order Markov process, where m=N−1. For example, a bigram model is a first-order Markov process. Incorporating an $m^{th}$ order Markov process having a total of M character templates results in an increase in computation for the dynamic programming decoding operation of a factor of $M^m$. For example, when the image model contains 100 templates, incorporation of a bigram model into the image model results in an increase in decoding computation of approximately a factor of 100.

The improvements provided by the technical advances disclosed in the '444 ICP patent, while significant, did not address the efficient decoding of an individual text line using a language model within the framework of the DID system. While the '986 Error Correction patent disclosure provides an example for using language models in a post-processing error correction operation, it does not address either the increase in computational complexity caused by the incorporation of a language model into the Markov image source or how to incorporate a language model in the initial image decoding operation.

Use of language models in the DID system provide the significant benefit of improved accuracy in the output transcription produced by decoding. Users of any text recognition system expect the system to produce virtually error-free results in a commercially practical timeframe, with little or no manual post-recognition error correction. It is desirable, therefore, to provide a method for using language models in the decoding operation in a computationally efficient manner.

SUMMARY OF THE INVENTION

The technique of the present invention provides for the efficient integration of a stochastic language model such as an N-gram model in the decoding data structure that represents a text line image in a line image decoding operation. The present invention is premised on the observation that the problem with using a stochastic language model is not the efficiency of computing the full conditional probabilities or weights for a given path through the data structure. Rather, the problem is how to effectively and accurately manage the expansion of the nodes in the decoding data structure to accommodate the fully conditional probabilities available for possible best paths in the graph, and the resulting increase in decoding computation required to produce maximum cumulative path scores at every image position.

The dynamic programming operation used for decoding is not capable of taking the prior path histories of characters into account during decoding unless each history is explicitly represented by a set of nodes and branches between nodes where the language model probabilities can be represented along with template-image matching scores. This is because the dynamic programming operation assumes that each branch is evaluated on its own and is not conditioned on the path that preceded that branch. The template-image match scores attached to branches do not depend on previous transitions in the path. When the decoder considers an image position and decides what character is most likely to be there based on the match scores, it does not need to look back at previous transitions in the path to this point and it doesn3 t care what characters occurred up to this point. Each image point evaluation is conditionally independent of previous evaluations. The language model, on the other hand, explicitly provides a component of the branch score that is conditioned on the characters occurring on previous branches. The additional nodes and edges needed to accommodate the paths that represent these previous states are what cause the exponential explosion in states in the graph that represents the image model.

The explosion in states significantly impacts the storage and computational resources needed to use a stochastic language model in conjunction with the image model during decoding. Expansion of the decoding data structure to allow for every possible history requires a prohibitive amount of storage. With respect to computational demands, recall that decoding is accomplished using a dynamic programming operation, such as a Viterbi procedure, to compute a set of recursively-defined likelihood functions at each point of the image plane. The increase in computation of the dynamic programming operation is $M^m$ for an $m^{th}$ order Markov process with M templates. For example, when an image model includes 100 characters, a bigram stochastic language model (N=1) increases the dynamic programming computation by a factor of 100. Computational requirements, then, typically dictate that an N-gram model use a small N.

The conceptual framework of the present invention begins with the decoding operation using upper bound scores associated with branches in an unexpanded decoding data structure that represents the image network. An upper bound score indicates an upper bound on the language model probabilities or weights that would otherwise be associated with a branch according to its complete character history. The use of upper bounds on the language model probabilities prevents the iterative search that forms the decoding operation from ruling out any path that could possibly turn out to be optimal.

A best path search operation then finds a complete estimated best path through the graph. Once the path is identified, a network expansion operation is performed for nodes on the best path in order to expand the network with new nodes and branches reflecting paths with explicit character histories based on the estimated best path of the just-completed iteration. Newly-added branches have edge scores with language model scores that are based on available character histories. The decoding and expansion operations are then iterated until a stopping condition is met. The present invention expands the states of the image model only on an as-needed basis to represent the fully contextual language model probabilities or weights for a relatively small number of nodes in the image network that fall on each estimated best path, allowing for the manageable and efficient expansion of the states in the image model to accommodate the language model. The expanded decoding data structure is then available to a subsequent iteration of the best path search operation.

A key constraint necessary to ensure optimal decoding with respect to the language model is that each node in the graph have the proper language model score, either a weight or an upper bound score, attached to the best incoming branch to that node. Failure to observe this constraint may cause the dynamic programming operation to reject a path through the graph that is an actual best path because of an incorrect score attached to a branch.

The language model techniques of the present invention may be used in any text line decoder that uses as input a stochastic finite state network to model the document image layout of the document image being decoded, and where branch scores in the image network change over time, requiring iteration of the dynamic programming operation. Thus, these techniques may be used in simple text line decoders, as well as in the two-dimensional DID method of image recognition disclosed in the patents cited above.

Therefore, in accordance with one aspect of the present invention, a method is provided for operating a processor-controlled machine to decode a text line image using a stochastic language model. The machine includes a processor and a memory device for storing data including instruction data the processor executes to operate the machine. The processor is connected to the memory device for accessing and executing the instruction data stored therein. The method comprises receiving an input text line image including a plurality of image glyphs each indicating a character symbol, and representing the input text line image as an image network data structure indicating a plurality of nodes and branches between nodes. Each node in the image network data structure indicates a location of an image glyph, and each branch leading into a node is associated with a character symbol identifying the image glyph. The plurality of nodes and branches indicate a plurality of possible paths through the image network, and each path indicates a possible transcription of the input text line image. The method further comprises assigning a language model score computed from a language model to each branch in the image network according to the character symbol associated with the branch. The language model score indicates a validity measurement for a character symbol sequence ending with the character symbol associated with the branch.

The method further comprises performing a repeated sequence of a best path search operation followed by a network expansion operation until a stopping condition is met. The best path search operation produces a complete path of branches and nodes through the image network using the language model scores assigned to the branches. The network expansion operation includes adding at least one context node and context branch to the image network. The context node having a character history associated with it. The context branch indicates an updated language model score for the character history ending with the character symbol associated with the context branch. The image network with the added context node and branch are then available to a subsequent execution of the best path search operation. The method further includes, when the stopping condition has been met, producing the transcription of the character symbols represented by the image glyphs of the input text line image using the character symbols associated with the branches of the complete path.

In another aspect of the present invention, the language model score and the updated language model score indicate probabilities of occurrence of a character symbol sequence in a language modeled by the language model. In still another aspect of the present invention the language model score is an upper bound score on the validity measurement for the character symbol sequence ending with the character symbol associated with the branch, and when the language model produces the updated language model score for the character history ending with the character symbol associated with the context branch, the updated language model score replaces the upper bound score on the branches in the image network.

In still another aspect of the present invention, each node in the image network data structure has a node order determined by a history string length of the character history associated with it, and the network expansion operation adds a context node for every node in the complete path having a node order less than a maximum order. The context node has a node order one higher than the node order of the node from which the context node is created, and the context node has a text line image location identical to the text line image position of the node from which the context node is created. In this aspect of the invention, producing the complete path of nodes and branches includes computing maximum cumulative path scores at image positions in the image network using the language model scores for the character symbols assigned by the language model to the branches, with the best path search operation maximizing the cumulative path score at each image position. Computing maximum cumulative path scores by the best path search operation includes, at each image position in the text line image and for each possible character symbol and for each node and context node at each image position, first computing a next image position for the character symbol in the text line image, and then computing a cumulative path score for a path including an incoming branch to a highest order node at the next image position. Then the best path operation compares the cumulative path score to a prior maximum cumulative path score for the highest order node at the next image position to determine an updated maximum cumulative path score for the next image position, and stores the updated maximum cumulative path score with the highest order node at the next image position.

The novel features that are considered characteristic of the present invention are particularly and specifically set forth in the appended claims. The invention itself, however, both as to its organization and method of operation, together with its advantages, will best be understood from the following description of an illustrated embodiment when read in connection with the accompanying drawings. In the Figures, the same numbers have been used to denote the same component parts or steps. The description of the invention includes certain terminology that is specifically defined for describing the embodiment of the claimed invention illustrated in the accompanying drawings. These defined terms have the meanings indicated throughout this specification and in the claims, rather than any meanings that may occur in other sources, such as, for example, documents, if any, that are incorporated by reference herein elsewhere in this description.

DETAILED DESCRIPTION OF THE INVENTION

1. General Overview of the Text Line Decoding Operation Using a Language Model

Figure 1:
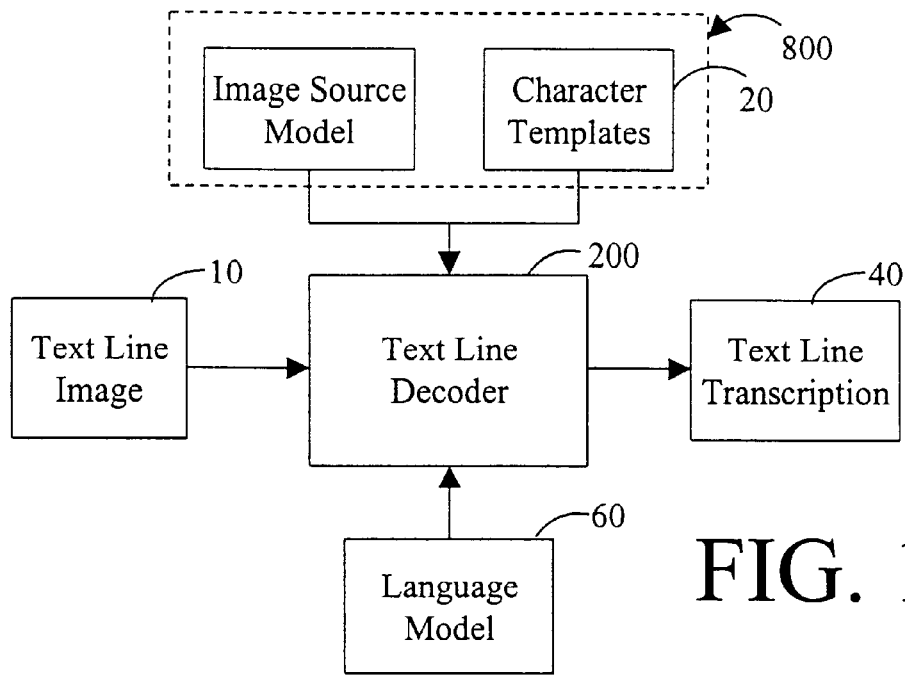
FIG. 1 is a block diagram of the input and output data structures that illustrate the general operation of the text line image decoder of the present invention.
Figure 2:
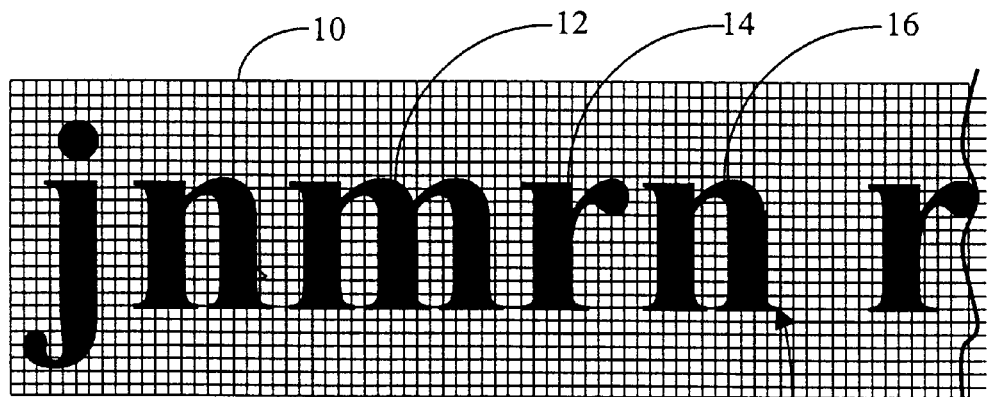
FIG. 2 is a schematic illustration of a portion of a text line image suitable for decoding by the decoding operation of the present invention.

FIG. 1 is a block diagram illustrating the input and output data structures of the text line decoder 200 of the present invention. In FIG. 1, text line image 10 is shown an input to operation 200, and is the image to be decoded. Text line image 10 is an image in the class of documents described by Markov source 800, and includes character images, also referred to as image glyphs. The term glyph as used herein is a single instance, or example, of a character or symbol that is realized in an image. In the language of the DID system, the image to be decoded is referred to as observed image Z (see the general framework of DID illustrated in FIG. 14). FIG. 2 schematically illustrates a portion of image 10 of FIG. 1 and is an example of an observed image Z. FIG. 2 shows the series of image glyphs represented by the character symbols "jnmrn r".

Figure 3:
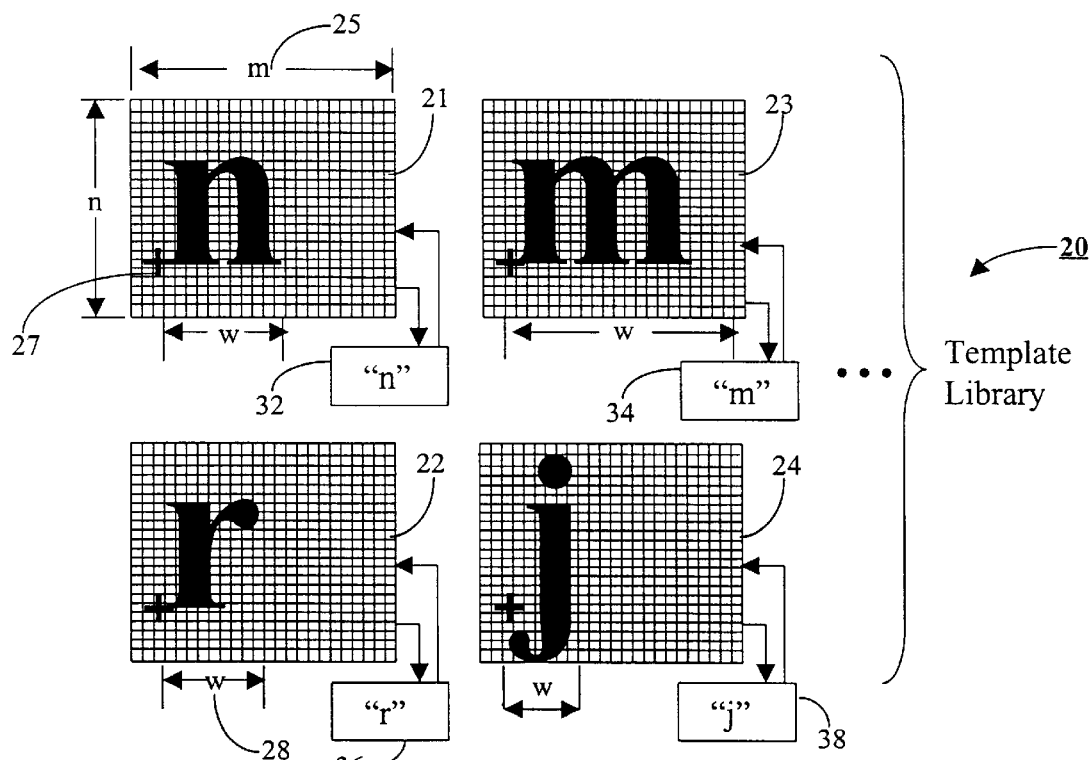
FIG. 3 is a schematic illustration of a library of character templates of the type used in the technique of the present invention.
Figure 5:
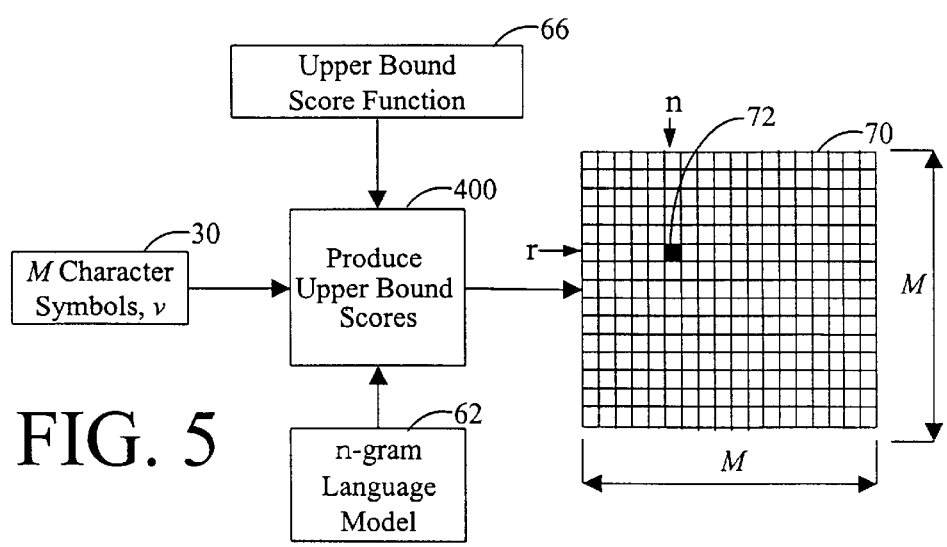
FIG. 5 is a block diagram illustrating the input and output data structures for the operation of producing upper bound scores or weights using the language model, according to an illustrated embodiment of the present invention.
Figure 16:
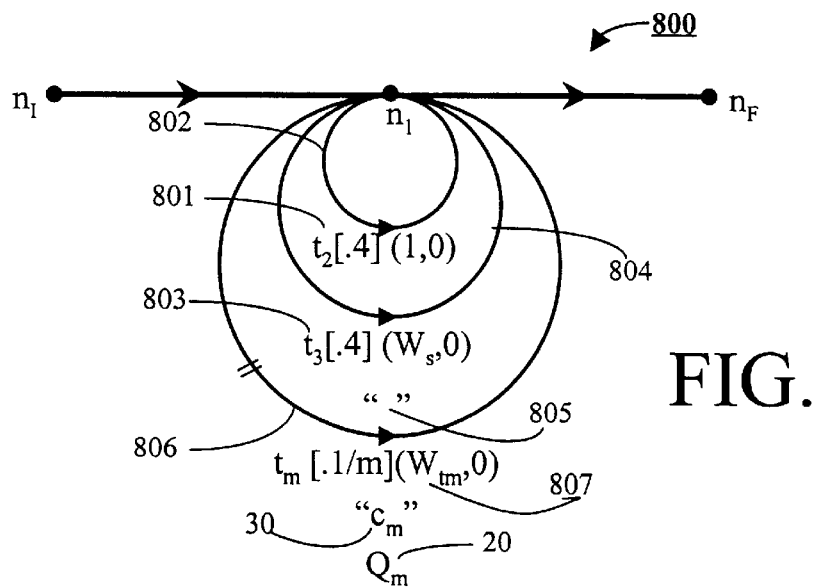
FIG. 16 is a schematic illustration of a simplified Markov source modeling a class of one-dimensional document images that each contains a single line of English text.

In FIG. 1, image source model 800 represents the spatial layout of a class of single text line images as a stochastic finite state network, and is an input to operation 200. Stochastic image models have been described elsewhere in the patent literature. For convenience, more information about the attributes, characteristics and operation of model 800 may be found in Section 6 below. FIG. 1 also shows a character template library 20 as part of image model 800. FIG. 3 shows library 20 of character template data structures of the type used by prior DID implementations and by the present invention. Each template data structure, such as template 21, indicates a bitmapped image of a character. As shown in FIG. 3, each template has dimensions m×n pixels, has an origin point illustrated in template 21 by crossbar 27, and a set width 28 labeled for further reference as set width w. The template origin of the templates in the illustrated template library 20 is designated at the same location within each template. Other types of data structures in addition to a bitmapped image may be used to represent a character template of the type suitable for use in the present invention; the illustration in FIG. 3 of character templates as 2D arrays of pixels is not intended to limit the invention in any way. Additional information about character templates may be found in U.S. Pat. No. 5,689,620, entitled "Automatic Training of Character Templates Using a Transcription and a Two-Dimensional Image Source Model". Image model 800 of FIG. 16 shows character template library 20 as attributes on the set 806 of transitions that comprise the "printing state" of the text line image model 800. In practical terms, there is typically one character template for every symbol in every font that is likely to appear in the text line image to be decoded. A typical character template library 20 used to decode a line of text printed in the English language in a single font and type size might contain as many as 100 character templates to account for upper and lower case letters, punctuation and other special characters, and numbers.

Each template data structure also indicates a character label identifying the character. A character label typically uniquely identifies a character in the character set used in the document text, but may also indicate some other information that uniquely identifies the particular template, or may additionally contain font identifying information, size, or type style information. In FIG. 3, character labels 32, 24, 36 and 38 are examples of the set 30 of character symbols being modeled by image model 800. Image model 800 models a character set in the language used in image 10, and typically includes at least one character symbol for every character in the language. Image model 800 of FIG. 16 shows character symbols 30 as attributes on the set 806 of transitions that comprise the "printing state" of the text line image model 800.

With continuing reference to FIG. 1, text line decoding operation 200 produces as output a transcription 40 of the image glyphs in text line image 10. So, for example, the transcription 40 expected from decoding the portion of image 10 shown in FIG. 2 is the message string "jnmrn r". In the framework of Document Image Decoding, decoding the text line is accomplished by using a conventional dynamic programming operation. In the implementation of the present invention illustrated herein, decoding a text line includes executing the Viterbi decoding procedure described in the referenced '444 ICP patent and in U.S. Pat. No. 5,321,773, as modified by the disclosure herein. Details of the decoding operation that are particularly relevant to the present invention are provided below in Section 3.

Figure 14:
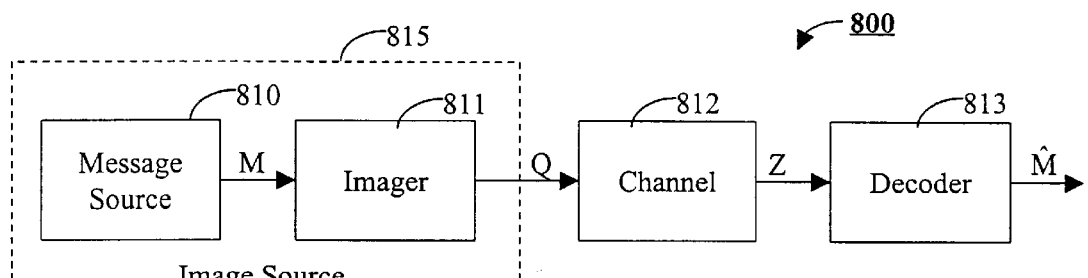
FIG. 14 is a block diagram illustrating the document recognition problem according to classical communications theory, which provides the framework for understanding the context of the technique of the present invention.
Figure 15:
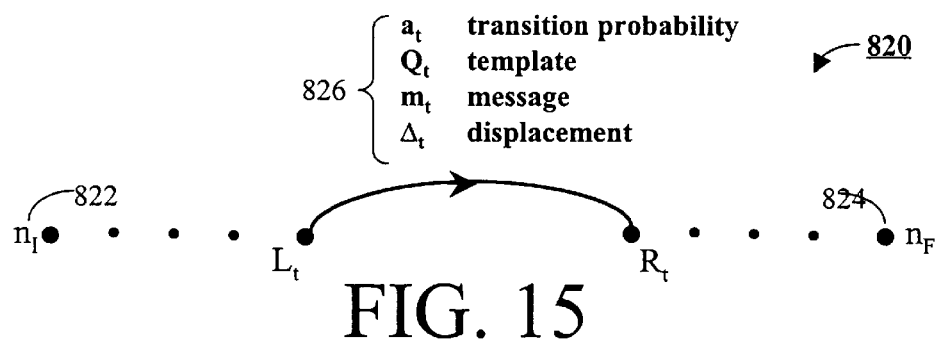
FIG. 15 is a schematic illustration of a general Markov source model that models a text image as a stochastic finite-state grammar represented as a network of nodes and transitions into the nodes.

In the DID framework, there is a set of probabilities in the image model that are derived from the channel model. With reference to FIG. 14, decoding operation 200 of FIG. 1 looks for the most likely observed image Z, in this case a text line, that could have come from the ideal image Q, given channel model 812. Observed image Z is represented by a path through image model 815. Transcription $\hat{M}$ is formed from the character labels identifying the templates associated with the branches in the path. Based on the channel model there is a certain probability distribution over a corrupted image. The probability distribution predicts certain images with certain probabilities. Decoding observed image Z involves computing a set of recursively-defined likelihood functions at each spatial point, x, of the image plane. The likelihood functions indicate the probability distribution evaluated on the specific set of data that is the observed image Z. Each individual node computation computes the probability that the template of a transition corresponds to a region of the image to be decoded in the vicinity of the image point. This template-image probability is represented by a template-image matching score that indicates a measurement of the match between a particular character template associated with a character c and the image region at the image point x. The reader is referred to the concurrently filed Heuristic Scoring disclosure for information about computing the template-image matching scores. Producing maximum cumulative path scores at each image position using the template-image matching scores is a way of building up the likelihood in a piece by piece fashion.

In the illustrated embodiment of decoding operation 200 described below, the template-image matching score is denoted as matchscore (x, c), representing the measure of how well the character template associated with the character c matches the observed image at location x. The implementation follows the rule that all nodes at a position x' whose histories h end in the same character c share the same template-image match score matchscore (x, c), where x=x' minus the spatial displacement, or set width, associated with c.

In the DID framework, the data structure that represents the image model is a graph (or trellis in earlier implementations) of nodes and branches, or edges, between nodes. Each branch is labeled with, or has associated with it, an edge score. When a language model is not included in the decoding process, the template-image matching scores are the likelihood terms that comprise the sole component of the edge scores. However, when the image model includes a stochastic language model, the edge score associated with, or assigned to, each branch in the image network includes a second component, in addition to the template-image match score. The second component is the language model score, or the contribution to the total edge score of the stochastic language model. The language model score is either a language model weight or an upper bound score, both of which are described in detail below. Since the edges are marked in log probabilities, the total score for an edge is computed by simply adding the template-image matching score and the language model score together.

2. Language Models a. The Role of Language Models in Text Image Decoding

FIG. 1 shows language model 60 as a source of data used by operation 200 during decoding. A language model provides a way for the decoding operation to prefer certain transcriptions, or character sequences, over others, a priori. A language model is predictively accurate, in the sense that the data that the language model assigns reflects the actual occurrence frequencies that will be observed in the texts in the language it models. However, there is no requirement that the language model be perfectly accurate in predicting these occurrence frequencies. In essence, a language model provides a measure of the validity of character strings observed in the text image being decoded.

In the illustrated implementation of the present invention the language model used is a causal sequential predictive probability distribution, and is referred to as a stochastic language model. The model provides a probability distribution for each character that is conditioned on the occurrence of previous characters. This probability distribution thus provides a probabilistic description of the validity of a certain character string in the text line image. For any finite string of length N, a stochastic language model specifies a valid probability distribution over all the strings of length N. The probability distribution is valid when the probabilities in the distribution sum to one and are non-negative.

The probability induced on the character strings must be computable in some convenient way. The most convenient way is to factor it as a product of conditional sequential probability distributions. Thus, the joint probability of an entire message, $P(v_1, v_2, \ldots, v_K)$, is the product of each of the probabilities of the individual characters of the message. In the most general case, the joint probability is conditioned on all of the previous characters. For example, $$P(v_1, v_2, \ldots, v_K) = P(v_i) * P(v_2|v_1) * P(v_3|v_1 v_2) * \ldots * P(v_K|v_1 \ldots v_{K-1}). \tag{1}$$

This formulation leads to an exponentially large number of letters and combinations to track, and is not practical. The language model is an approximation of Equation (1). When the occurrence of a character is conditioned on one preceding conditioning character, the approximation looks like $$P(v_1 v_2 \ldots v_K) \approx P(v_1) * P(v_2|v_1) * P(v_3|v_2) * P(v_4|v_3) * \ldots * P(v_K|v_{K-1}). \tag{2}$$

When the occurrence of a character is conditioned on two preceding conditioning characters, the approximation looks like $$P(v_1 v_2 \ldots v_K) \approx P(v_1) * P(v_2|v_1) * P(v_3|v_1 v_2) * P(v_4|v_2 v_3) * \ldots * P(v_K|v_{K-2} v_{K-1}). \tag{3}$$

Generalizing the model by using a conditioning variable, i, to express the number of conditioning letters gives $$P(v_K|v_1 v_2 \ldots v_K) \approx P(v_K|v_{K-i} \ldots v_{K-1}). \tag{4}$$

A language model of the type expressed in Equation 4 is called an N-gram model. The N in N-gram expresses the maximum number of conditioning characters on, or the history of, a candidate character. An N-gram language model corresponds to an $m^{th}$ order Markov process, where m=N−1. For example, a bigram language model (N=2) is a first-order Markov process.

Figure 4:
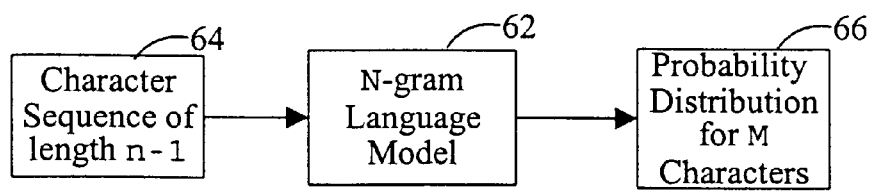
FIG. 4 is a block diagram illustrating the function of the language model of FIG. 1 in the present invention.

FIG. 4 is a simple block diagram illustrating the functionality of N-gram language model 62, which is used in the illustrated implementation of the present invention and is an example of language model 60 of FIG. 1. Model 62 takes a character sequence of length N−1 and produces the valid probability distribution for all M characters in the image model. The term language model weight, or simply weight, is used to mean one of the probabilities in a valid probability distribution produced by language model 62 for a given character string over all strings in the model. In a properly expanded decoding data structure, each branch incoming to a node has assigned to it the language model weight of the character associated with the branch, given the character history associated with the node.

One example in which the language model may assist in, or influence, the decoding result is when the decoder cannot correctly resolve visual ambiguity in the image. In that case, the weights supplied by the language model will tip the balance between two visually similar character sequences in favor of the character sequence with the higher weight in the language model. For example, image 10 of FIG. 2 shows a common decoding ambiguity problem. The character pair "rn" may sometimes be mistaken for the single character "m". Thus, characters 14 and 16 may either be decoded as the single character "m" or as the character "r" followed by the character "n". A decoder without the benefit of the stochastic language model component might match an "m" at image position 18 instead of the character pair of an "r" followed by an "n". Suppose that language model 62 is a bigram model that indicates a higher probability for the character "r" following an "m" than for the character "m" following an "m". In that case, decoder 220 with the benefit of the stochastic language model information should be able to identify the character "n" ending at image position 18. Note that in the case of image 10, language model 62 must be modeling a language other than English!

Note that a variable N-gram model is a special case of an N-gram language model for large N. The variable N-gram language model has the ability to reduce the length of the history it deems significant in assigning conditional probabilities to characters. So, for example, suppose an N-gram model of N=10 encounters a space character at the 5th character before the current character. The model may be able to recognize a word boundary and stop when it encounters the space, knowing that the sequence of characters ending the preceding word is of no relevance to the probability of the current character.

b. Producing Upper Bounds on the Language Model Weights

Decoding operation 200 (FIG. 1) initially represents the image network as an unexpanded trellis-like graph data structure and associates an upper bound score with each branch in the network. The upper bound score, which is not a probability itself, is an upper bound on the language model weight that would otherwise be associated with the branch according to its history. Since, as noted above, the language model weight provides a probabilistic description of the validity of a certain character string in the text line image, the language model weight may be viewed as a measurement measuring the validity of a certain character string in the text line image. The upper bound score is an optimistic validity measurement for the string.

The use of upper bounds on the language model probabilities prevents the iterative search that forms the decoding operation from ruling out any path that could possibly turn out to be optimal. In the present invention, the graph is selectively and iteratively expanded to include the prior context of nodes only for nodes that are potential candidates for the best path through the graph. How these nodes are determined is explained in Section 4 below, in the discussion accompanying network expansion operation 300 of FIG. 12.

The initial pass of decoding operation 200, then, requires upper bound scores for all branches in the unexpanded graph that represents the image network. These upper bound scores are typically computed in advance of decoding and stored in an appropriate data structure for access by decoding operation 200. FIG. 4 is a block diagram showing the inputs and output of operation 400 for producing the upper bound scores. Operation 400 takes as input the M character symbols 30 in image model 800, N-gram language model 62 and upper bound function 66. Operation 400 then produces an upper bound score for every character v in M, according to upper bound score function 66. The upper bound score for a given v is an upper bound for all previous paths leading to v.

For N-gram language model 62, a valid probability distribution for a given character sequence would be computed according to Equation (4), by multiplying together the probabilities for the last N−1 letters. In contrast, the general form of a representative upper bound score function 66 may be expressed as $$q(v_k|B) = \max_A P(v_k|AB) \quad (5)$$

where B is the sequence of j preceding characters, $0 \leq j \leq N-1$, and A ranges over all (N−j−1)-long sequences of characters. Equation (5) produces a probability distribution as well, but it is not a valid probability distribution (i.e., the probabilities are not necessarily nonnegative and do not sum to one.) When j=0, $q(v_k|B)$ is simply $q(v_k)$ and the upper bound function is a unigram function. When j=1, the upper bound function is a bigram function. Note that when j=N−1, $q(v_k|B)$ is the same as the probability distribution defined by Equation 4. A bigram upper bound score upper bounds the language model weight of each character with some quantity that depends only on the last single letter instead of the last N letters. Note that how far upper bound score function 66 looks back (i.e., how many characters are included in the prior context) to produce the upper bound score may be a variable parameter input to operation 400. Equations (4) and (5) together comprise the q(h, c) function described in Section 3 below in conjunction with FIG. 6.

Operation 400 produces the upper bound scores as follows. For each possible character, operation 400 produces a valid probability distribution for N-gram language model 62 using Equation (5), and then searches through the probability distribution for the maximum language model weight. This maximum language model weight is the upper bound score used to represent all character sequences ending with the character. Since a language model weight in a valid probability distribution for a specific character sequence ending with the character can never be greater than this maximum probability, the path produced by decoding operation 200 can never be better than the one predicted by this upper bound score and is an optimal path for the data (scores) used. Any path that does better than other paths using the upper bound scores must be the best possible path for this data because the upper bound scores are optimistic.

Equation (5) thus represents an upper bound score function 66 that produces strict upper bounds on the language model probabilities, such that a path through the decoding graph is always an optimal path given the scores used to produce the path. However, other upper bound score functions are also possible that do not produce strict upper bound scores. If non-strict upper bound scores are used, the resulting path could still be approximately optimal, such that the more strict the bound, the more certain the optimality of the final path.

The output of operation 400 is an upper bound score for every character in the image source model. These scores may be stored in an appropriate data structure, such as array 70 of FIG. 4, which is suitable for storing the upper bound scores for a bigram upper bound function. Array 70 has dimensions M×M, where M is the total number of unique character symbols in the image source model. Each entry is the upper bound score of the letter in the column given the letter in the row. In array 70 of upper bound scores, there is an upper bound on the language model weight of $v_k$ given $v_{k-1}$. For example, entry 72 of array 70 is the upper bound score of the character "n" for strings in the N-gram language model 62 that end in the character "r" and precede "n", as computed using Equation (5). An upper bound unigram score produces an upper bound on the language model weight of each character that depends only on that character. When a unigram upper bound score function is used, the upper bound scores are stored in a vector of length M, where M is the total number of unique character symbols in the source model. Each entry in the vector is the upper bound score of the letter $v_K$. For example, an entry in the vector for the letter "r" is the upper bound score of "r" given all strings in N-gram language model 62 that precede "r", as computed using Equation (5).

In general, for an N-gram model, the cost of storage required as a result of pre-computing all of the upper bound scores needed during decoding will depend on the factors of N, the number of the language model, and k, the number of characters in template library 20, and can be generally described as being $k^N$ entries.

A bigram upper bound function gives a stricter upper bound than a unigram upper bound function. A unigram upper bound function is likely to be a "looser" upper bound because a good language model will indicate some context for which the language model weight of a given letter preceded by n–1 other letters is close to 1. For example, for many letters there is a high probability (e.g. close to 1) for the occurrence of a letter at the end of words, given a string of preceding letters. If all or most of the upper bound scores are close to one, they may influence the decoding operation very little and lead to more decoding iterations than are necessary. A bigram upper bound function is predicted to give a wider range of upper bound scores.

3. Decoding Using a Stochastic Language Model a. Overview and Terminology

Figure 6:
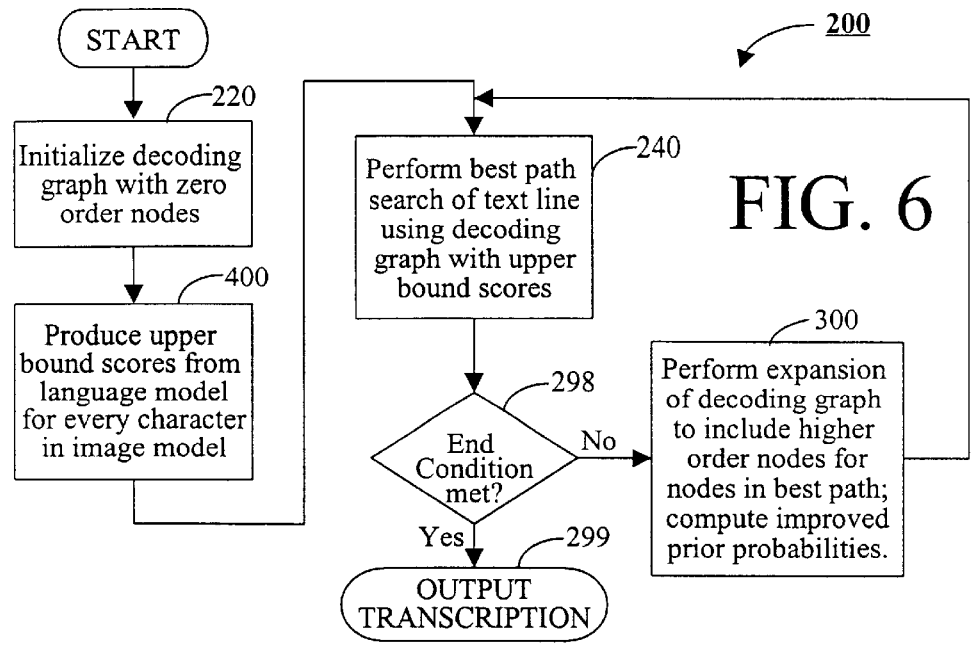
FIG. 6 is a top-level flowchart illustrating the process flow of the operations for incorporating a language model into an image network and decoding a text line, according to an illustrated embodiment of the present invention.

FIG. 6 is a top-level flowchart of the major processes of an illustrated embodiment of dynamic programming text line decoding operation 200 of the present invention. Operation 200 incorporates a language model into an image network represented by a decoding graph using a selective graph expansion process. Operation 200 begins with two preparatory functions in box 220 and box 400. In box 220, an initialization process initializes the decoding graph with zero-order nodes (defined below) at every spatial x location; initialization thus creates a data structure of the type illustrated by node data structure 610 in FIG. 7 (described below) for every x location. Operation 400 then produces upper bounds on the language model probabilities, as discussed in Section 2 above, for each character in the image model, making these upper bound scores available to best path search operation 240.

FIG. 6 shows the decoding process as an iterative process. After completion of preparatory tasks 220 and 400, processing control passes to a repeated sequence of operations 240 and 300 that continue until an end condition is tested and met in box 298. As noted earlier, the conventional method for incorporating a language model into a stochastic image network is to initially expand every node in the network, prior to decoding, with all possible transitions and nodes that the language model allows. The transitions in this expanded network are labeled with language model weights for specific character sequences having a certain length that are obtained from the language model and that reflect the valid probability distribution over all character strings of that length in the model. Then decoding is accomplished with a single processing pass through the expanded network to produce the best path through the network. In contrast, the technique of the present invention seeks to start decoding with an unexpanded image network with transitions into nodes labeled with upper bound scores, and to then selectively expand the image network as promising paths through the network are found. Each iteration of decoding operation 240 produces a candidate estimated best path, referred to as the current path, through the decoding graph. The current path is determined using maximum cumulative path scores that are developed during the search process using the upper bound scores. Then an end condition is tested, in box 298. If the end condition test is not met, the expansion functions of network expansion operation 300 are performed. Network expansion operation 300, discussed in Section 4 below, expands the decoding graph for nodes on the current path by adding higher order nodes (defined below) for the identified best-path nodes. Network expansion operation 300 also computes language model weights for the specific character sequences associated with the higher order nodes, and associates these newly computed language model probabilities with their respective nodes.

Processing control passes from network expansion operation 300 to best-path search operation 240 for another iteration. The decoding graph available for the best path search in each iteration of operation 240 has included in it the new higher order nodes and branches with new language model scores just produced by network expansion operation 300 that reflect available character histories. These language model scores typically affect the computation of scores used during the best-path search, and a new candidate best path results from each iteration of operation 240. Decoding terminates when the end condition in box 298 is satisfied. That is, decoding terminates when each of the nodes included in the current best path in the decoding graph is at its maximum order (defined below). Upon completion of decoding, the transcription output is available, in box 299, for printing or further processing by another operation.

The illustrated implementation is best understood using the following specific terminology and definitions. The language model weight for a candidate character c depends on a specific prior sequence of characters leading up to c. A set of h preceding characters up to and including c is referred to as the history, or context, of c. A history has length |h|. A node in the decoding graph is a (state, location) pair uniquely defined by a spatial x location on the text line image and a history, h. A branch (also referred to as an edge or transition) of the graph connects two nodes. The attributes of a branch indicate a character template having its end position at the image position marked by a node, and an associated character label identifying the character. The order of a node is the length of the history h associated with that node. Thus, a node with a history h of 1 (one) character is a first-order node, a node with a history h of 2 (two) characters is a second-order node, and so on. There may be more than one node at the same spatial x location on the text line image because the nodes may have different orders. In the image network representing the text line image illustrated in the present invention, there is at least one node, referred to as the zero-order node, for each spatial location x in the image network. A zero-order node has a zero-length empty, or null, history, and has an upper bound score from the language model associated with the transition into the node for scoring purposes. In the figures, nodes having different orders are shown at different levels, with zero-order nodes shown at the lowest level, first order nodes shown at a level above zero-order nodes, and so on. The history denoted as h' is a backward extension of history h if |h'|>h and h' matches h in their last h characters.

The illustrated implementation of decoding operation 200 described below makes use of two functions related to the use of an N-gram language model. The first of these functions is a boolean function referred to as the maximum order function, and will be designated as ismax(h). The function ismax(h), given a character sequence history, h, returns true if and only if the language model will treat all backward extensions h' of h as equivalent to h when computing the function q, which is defined immediately below. When ismax (h) returns true, the character sequence history h is defined to be at its maximum order with respect to the language model being used, such that the language model is capable of producing a language model weight for character sequence history h. When character sequence history h is at its maximum order, all backward extensions h' are also at the maximum order and are handled by the language model in a manner equivalent to h. With respect to nodes identified to be included in a best path in the decoding graph used during decoding operation 200, a node is of maximum order if ismax (h) is true, where ismax (h) is as just defined, and where h is the history associated with the node. When ismax (h) returns false, the character sequence history h is not at its maximum order with respect to the language model being used, and the language model is capable of producing a language model weight only for a character sequence history of some length longer than h. Note that for a fixed N-gram language model, the rule that ismax (h) function will be true if and only if $|h|=N-1$ has an exception for the portion of the text line string at the beginning of the text line, where the available history is of length less than N−1, in which case ismax (h) will be true if an only if h is the full available history. Note that the ismax (h) function may be implemented as a table look up.

The second of the functions used by decoding operation 200 is designated as q(h, c). The function q(h, c) returns a score associated with character c when the history is h. If ismax (h) returns true, then q(h, c) produces a valid probability distribution for c given h according to the language model 62 and using Equation (4), and the language model weight of c is obtained from this distribution When ismax (h) returns false, then the score is the upper bound score on the language model probability of c given h' over all backward extensions h' of h, as computed, for example, using Equation (5). Recall that this upper bound score is itself selected from a probability distribution produced by Equation (5) but not from a valid probability distribution. In effect, the function q(h, c) computes the tightest upper bound on the language model weight that it can, given the character sequence history it is provided, with the language model weight being most accurate when the node (and its associated history) is at the maximum order for the language model being used.

b. Graph Data Structure

Figure 7:
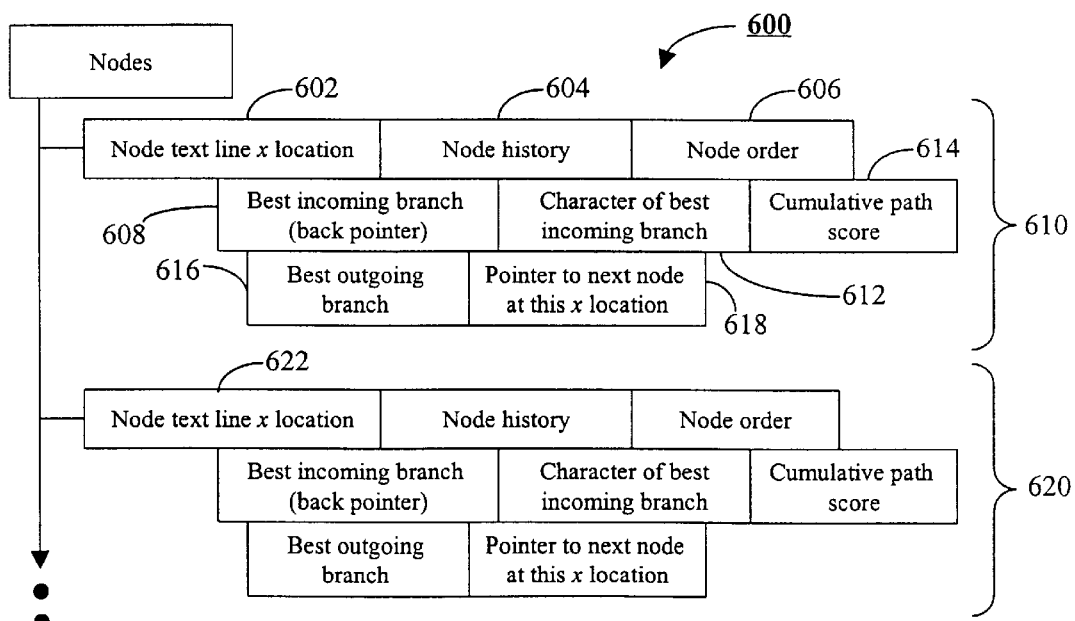
FIG. 7 is a schematic illustration of the data items included in a decoding graph data structure for representing nodes during the decoding operation, according to an illustrated embodiment of the present invention.

A data structure representation of the decoding graph of the illustrated implementation stores the data needed for processing each node and is schematically illustrated in FIG. 7. A data structure as used herein is any combination of interrelated data items, and does not imply any particular data organization. The term indicate is used to express a relationship between data items or a data item and a data value. A data item indicates a thing, an event or a characteristic when the item has a value that depends on the existence or occurrence or the measure of the thing, event or characteristic. A first item of data indicates a second item of data when the second item of data can be obtained from the first item of data, when the second item of data can be accessible using the first item of data, when the second item of data can be obtained by decoding the first item of data, or when the first item of data can be an identifier of the second item of data. For example, a node in the best path indicates an associated character history, h.

Data structure 600 of FIG. 7 includes information about nodes in the decoding graph, and illustrates by way of example two node data structures 610 and 620. As noted earlier, a node is identified by a spatial location x in data item 602 and a history h in data item 604. Each node data structure also includes node order information 606, identifying the order of the node, and information about the path in the neighborhood of the node. Specifically, for every node there is also stored the best incoming branch 608, the character label 612 of the character template associated with the best incoming branch, and the cumulative path score 614 of the best path to this node. Data structure 610 also stores the best outgoing branch 616 from this node and a pointer 618 to the node data structure for the next node (of a different order) at this x location. In the illustrated implementation, an additional data structure is maintained that includes a list of nodes at each spatial x location in the text line.

In earlier implementations of Document Image Decoding technology, the decoding operation produced a node score array and a backpointer array. The array of node scores included one best cumulative path score for each x position in the text line image. The backpointer array for a node identified the most likely branch into the node among all branches that enter the node, that is, the branch at each image location that maximized the score. The most likely branch into the node identified the most likely character template that ended at that image position in the text line. Data structure 600 provides the equivalent information by storing for each node the best incoming branch 608, the character label 612 of the character template associated with the best incoming branch, and the cumulative path score 614 of the best path to this node. During backtracing operation 290 (FIG. 9) that takes place at the end of decoding operation 240, data structure 600 is used to identify the location of the nodes in the current estimated best path by starting at the end of the text line image and tracing back through the decoding graph using the best incoming branch and the cumulative path score 614 stored for each node.

Figure 8:
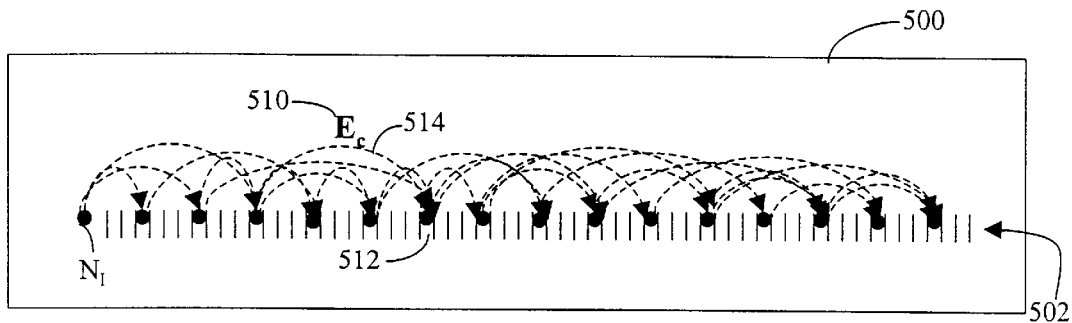
FIG. 8 is a schematic illustration of a portion of a decoding graph of the type used by an illustrated embodiment of the present invention, and showing a portion of the possible nodes and branches in the graph.

FIG. 8 is a graphical representation of one-dimensional decoding graph 500 representing a portion of image network 800 of FIG. 1. Decoding graph 500 has a start state $N_I$ at the left of the graph corresponding to the left edge of a text line. Final state $N_F$ at the right edge of the text line is not shown. Decoding graph 500 has a series of image pixel locations 502 marked by the vertical tick marks. FIG. 8 shows a small number of the possible nodes 512 and branches 514 between nodes that make up decoding graph 500. Nodes in decoding graph 500 are zero-order nodes and are shown as small black circles. The branches shortest in length have as their attributes character templates with relatively small set widths, such as character template 24 in FIG. 3. The medium length branches indicate character templates with medium size set widths, such as character templates 21 and 22 in FIG. 3. And the longest branches indicate character templates with the largest set widths, such as character template 23 in FIG. 3. In addition, image network 800 as shown in FIG. 16 includes transition 802 to allow for fine spacing adjustments. Those branches are not shown in graph 500 but these fine adjustments allow for a path through the graph to reach a node at any image position. It can be seen that the branches and nodes form many different paths through graph 500. It can also be seen that any one node 512 has multiple incoming and outgoing branches. Each branch in the graph for a given character template at a given image position has a composite edge score, denoted as $E_c$, associated with it. For example, branch 514 is marked with composite edge score 510. A composite edge score includes the sum of the log probability indicating a template-image matching score for the character template at that image position and the log of a language model weight. As discussed above, the value of the language model weight for zero-order nodes is an upper bound score. As decoding progresses and higher order nodes are created, the value of the language model weight component of an edge score is computed using the q(h, c) function.

c. Best Path Search Operation

Best-path search operation 240 in this illustrated embodiment of the present invention operates in a manner similar to, but slightly modified from, prior implementations of DID. The forward phase of best-path search operation 240 involves identifying, for each pixel position in the image, the most likely path for arriving at that position, from among the paths generated by the printing of each character template and by using the most likely paths for arriving at all previously computed positions. For each image position and each transition into every node, operation 240 uses the composite edge scores and previously computed cumulative path scores to compute the likelihood of the best path terminating at this node and image position after passing through the transition. Operation 240 is carried out in the forward direction until the end-point of the best path is unambiguously identified.

Figure 9:
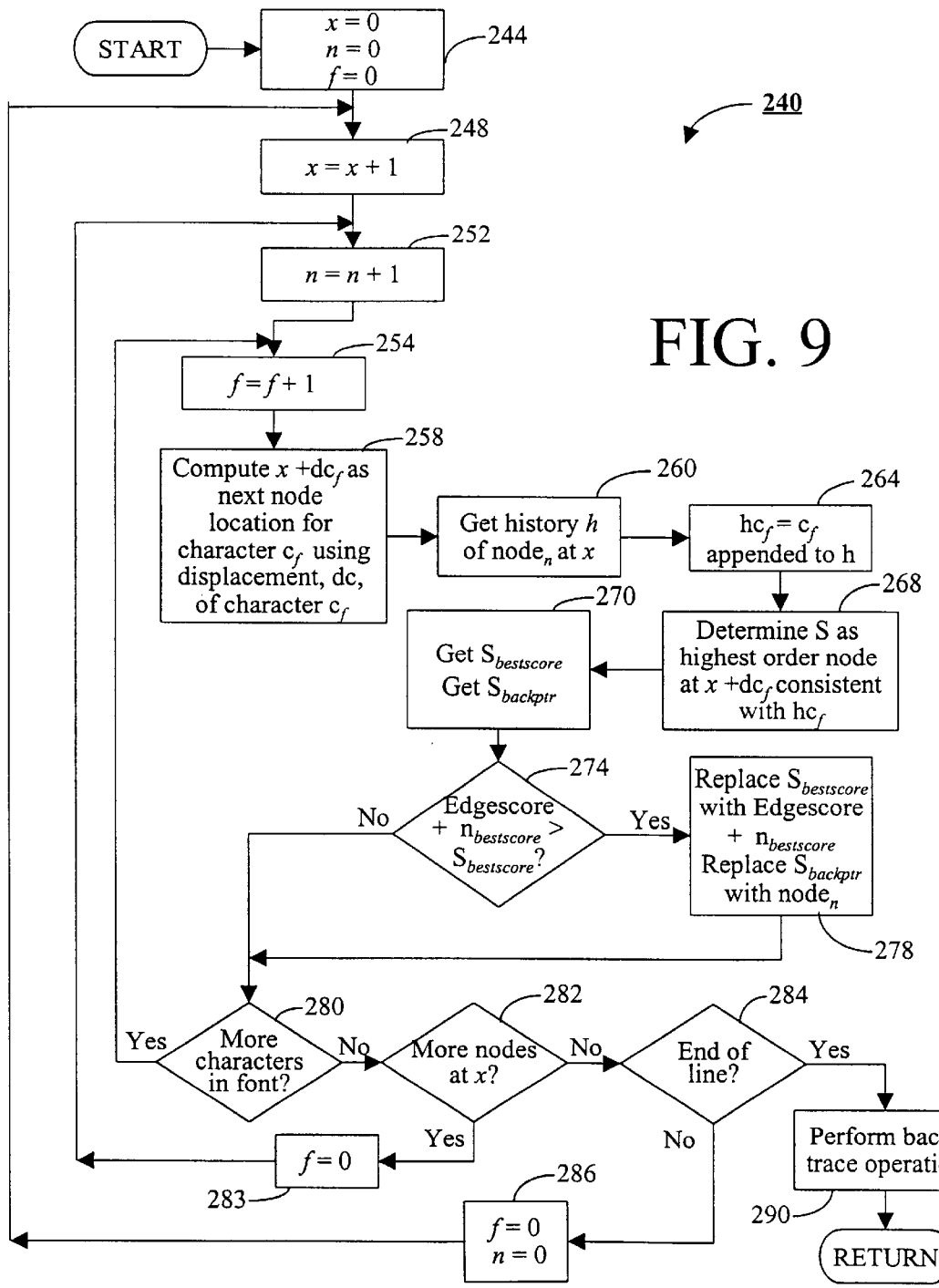
FIG. 9 is a flowchart of the functions of the best-path search operation of FIG. 6, according to an illustrated embodiment of the present invention.

The flowchart of FIG. 9 illustrates the process flow for best path search operation 240. In this illustrated implementation, operation 240 is comprised of three main loop structures that control process flow. The variables x, n andf that control the loop operations are initialized to zero, in box 244, at the beginning of operation 240. The outermost loop, delimited by box 248 and box 284, processes each image position x in the text line image being decoded until the end of the line is reached. The middle loop, delimited by box 252 and box 282, processes each node n, denoted $node_n$, at a given image position. Recall that there may be multiple nodes at each image position x, each of which is of a different order; the middle loop ensures that all such nodes are processed. The innermost loop, delimited by box 254 and box 280, controls the processing of each character $c_f$ in the character template library 20 (FIG. 3). The processing of each character $c_f$ is handled by the functions in box 258 through box 274. These functions essentially update the cumulative path scores stored in node data structure 600 (FIG. 7) when new language model scores computed from the language model during a prior execution of network expansion operation 300 cause changes to occur in those cumulative path scores when they are recomputed. The updated cumulative path scores, in turn, may result in a new estimated best path to emerge during the backtrace operation that follows the completion of the three loops.

Figure 10:
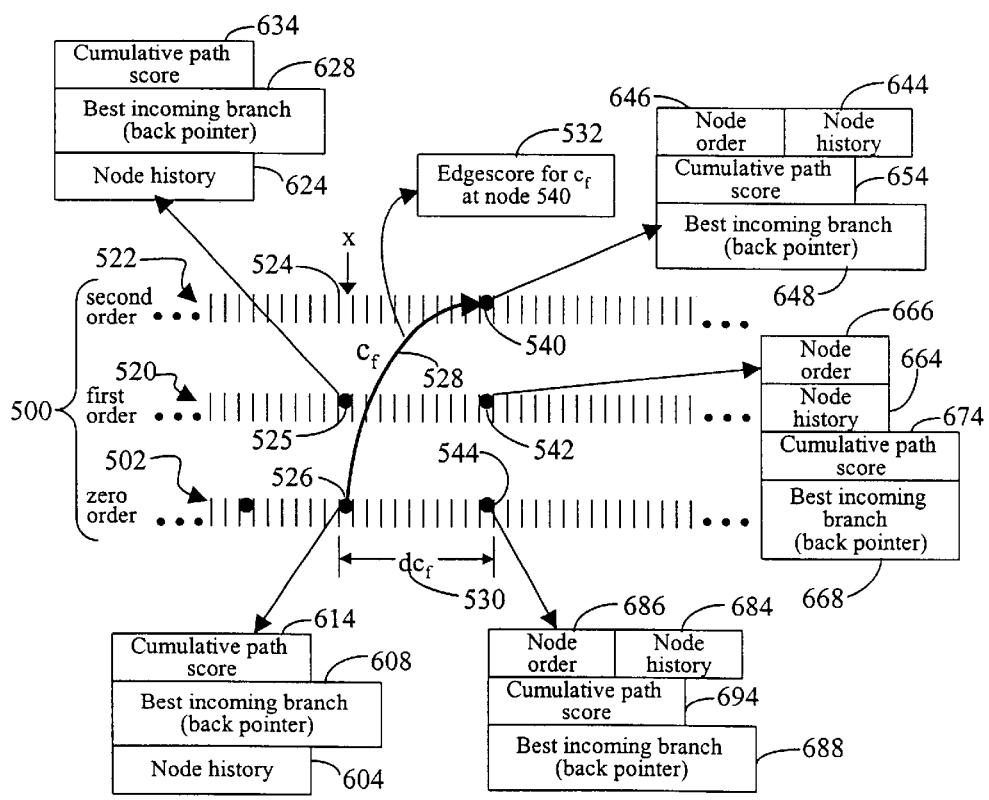
FIG. 10 schematically illustrates a portion of the decoding graph and data items related to nodes and branches in the graph that are used during the best path search operation illustrated in the flowchart of FIG. 9.

The processes of operation 240 will be described in conjunction with the partial decoding graph 500 shown in FIG. 10. Decoding graph 500 is represented as three horizontal rows of vertical tick marks representing a selected portion of image positions in the image text line. Row 502 shows the location of zero-order nodes that have a null, or empty, history h, row 520 shows the location of first-order nodes that have a history h comprised of one prior character, and row 522 shows the location of second-order nodes that have a history h comprised of two prior characters. Best path search operation 240 is described in the context of an interim iteration, after decoding graph 500 has been expanded to the state shown in FIG. 10 as a result of some number of prior repeated sequences of best path search operation 240 followed by network expansion operation 300. The portion of decoding graph 500 illustrated in FIG. 10 shows zero-order nodes 526 and 544, first-order nodes 525 and 542 and second order node 540. FIG. 10 also shows arrows pointing from these nodes to selected data items from node data structure 600 (FIG. 7) that are used during operation 240 and are referenced in the processing description that follows. Also shown in decoding graph 500 is branch 528 from zero-order node 526 to second-order node 540. Branch 528 is labeled with the designation of a character $c_f$ from the template library, and has a curved arrow pointing to data item 532, which is the edge score for character $c_f$ at node 540. As noted earlier, preliminary to performing best path search operation 240, composite edge scores for each character $c_f$ at each image position x are computed and stored in a suitable data structure such as a table.

With reference now to FIG. 9, assume that processing through several image positions x has already been completed, loop control variables n andf have been reset to zero in box 286. Assume also that loop control variable x has just been incremented by one in box 248 to arrive at image position 524 in decoding graph 500. Control then passes to box 252 where node loop control variable n is incremented by one to process the first of the nodes at image position 524, which is node 526. Control then passes to box 254 where the first of the characters in library 20, designated as $c_f$, is identified for processing. As noted earlier, each character in library 20 has a set width 28 (see FIG. 3) which measures its displacement d on the image text line. Operation 240 computes the ending image position of character $c_f$, in box 258, by adding its displacement d to the image position x at location 524, designated in FIG. 10 as $x+dc_f$ and shown by displacement 530. Then, in box 260, the history for node 526 is retrieved from data structure 600 in data item 604, and the current character being processed, $c_f$, is appended to node history 604 to form history $hc_f$, in box 264.

Next, operation 240, in box 268, determines the highest order node at image position $x+dc_f$ that has a node history consistent with $hc_f$ and designates this node as S. This involves examining the node histories 644, 664 and 684 respectively of each of the nodes 540, 542 and 544. There will always be a node S because the history of a zero-order node (i.e., the null history) is always consistent with history $hc_f$, and there is at least a zero-order node at every image position. The history of any given node is consistent with $hc_f$ when the node's history is either identical to $hc_f$ or the node's history is identical to a beginning portion of $hc_f$. For example, when $hc_f$ indicates the string "rec", ode histories "rec" and "re" are both consistent with $hc_f$.

For illustration purposes, assume that node history 644 of node 540 is consistent with the history, $hc_f$. In effect, operation 240 examines the branch 528 from node 526 to node 540 to determine if this branch improves the cumulative path score of node 540. To do this, operation 240 retrieves, in box 270, the best cumulative path score 654 for node 540, denoted $S_{bestscore}$ in box 270, and the back pointer (best incoming branch) 648 of node 540, denoted $S_{backptr}$. Then, operation 240 computes the cumulative path score to node 540 via branch 528 by adding the cumulative path score 614, denoted as $n_{bestscore}$, at node 526 to the edge score for $c_f$ at node 540, referred to as Edgescore in box 274. Box 274 then compares this new cumulative path score to $S_{bestscore}$ (the cumulative path score 654 for node 540) and if Edgescore+$n_{bestscore}$ is greater than $S_{bestscore}$, then control passes to box 278 where cumulative path score 654 and backpointer 648 for node 540 are updated with Edgescore+$n_{bestscore}$ and node 526, respectively. Then processing proceeds to box 280. If Edgescore+$n_{bestscore}$ is not greater than $S_{bestscore}$, then control passes to box 280 where a query is made as to whether there are more characters in the template library to process.

When there are more characters, control passes to box 254 where the loop variable f controlling character processing is incremented to process the next character. The next character $c_f$ is then subject to the same sequence of operations in boxes 258 through box 274. The next node location x+$dc_f$ is computed in box 258, and history $hc_f$ is produced in boxes 260 and 264. Then, operation 240 examines node data structure 600 for the highest order node at image location x+$dc_f$ that has history $hc_f$. Operation 240 then determines, in box 274, whether the cumulative path score and backpointer for that highest order node at image location x+$dc_f$ should be updated. Processing for node 526 continues in this manner for every character in template library 20.

When all characters in template library 20 have been processed for node 526, control passes from box 280 to the query in box 282 that tests whether there are additional nodes at image location 524. If so, the loop variable fcontrolling character processing is set to zero in box 283, and control passes to box 252 where the loop variable n controlling node processing at the current image location is incremented. In decoding graph 500 illustrated in FIG. 10, node 525 is processed next, in the same manner as just described for node 526. At a given image location, nodes at that location may be processed in any order. When all nodes at image location 524 have been processed, the test in box 282 transfers control to box 284 which tests for an end of line condition. If there are more image positions to process, loop control variables f and n are set to zero in box 286 and control transfers to box 248 where loop control variables x is incremented to process the next image position x on the text line image.

When the end of the text image line is reached, control transfers to backtrace processor 290 which uses data structure 600 as updated by decoding operation 240 to trace back from the location of the last node in the text line using the back pointer data items in data structure 600. Backtracing in this manner generates an estimated best path comprised of nodes and branches through the image network. The nodes on the best path determine the locations of the glyphs in the image. When end condition 298 (FIG. 6) is met, decoding operation 200 is complete, and a message string, or transcription, is produced from this path. The transcription is composed of an ordered sequence of concatenated character labels associated with the templates that are attributes of the incoming branches of the nodes of the estimated best path. Additional details that may be relevant to understanding the decoding and backtracing processes may be found in U.S. Pat. No. 5,526,444 at cols. 7–9 and the description accompanying FIGS. 19–22 therein.

The order of the processing loops in operation 240 is designed to ensure that the best cumulative path score is propagated forward through the text line so that the quantity $n_{bestscore}$ is valid and final at the end of the line. Thus, operation 240 may be implemented in any manner that updates the best cumulative path score for every node that needs updating and ensures that the best cumulative path score is valid and final at the end of the line.

4. Network Expansion Operation

One of the functions of network expansion operation 300 is to efficiently expand the states (nodes), and by implication the branches, of decoding graph 500 to reflect language model weights as they become available. Another function of operation 300 is to ensure that every branch after the expansion of decoding graph 500 is labeled with the appropriate language model score, either an upper bound score or a language model weight. In order for the language model to be effective in decoding, every expanded path has to be conditioned on an unambiguous specific history and an edge score must depend on a specific path, not on a collection of paths. The sharing of path edges by two or more paths raises an ambiguity issue because edges that subsequently emanate from that shared edge have different possible contexts, and the backpointer processor cannot unambiguously follow a candidate best path back to its origin. During discussion of the expansion of decoding graph 500 that follows, reference is typically made only to these language model scores, while references to the template-image matching scores, which are the other component of the edge scores in the graph, are generally omitted.

Figure 11:
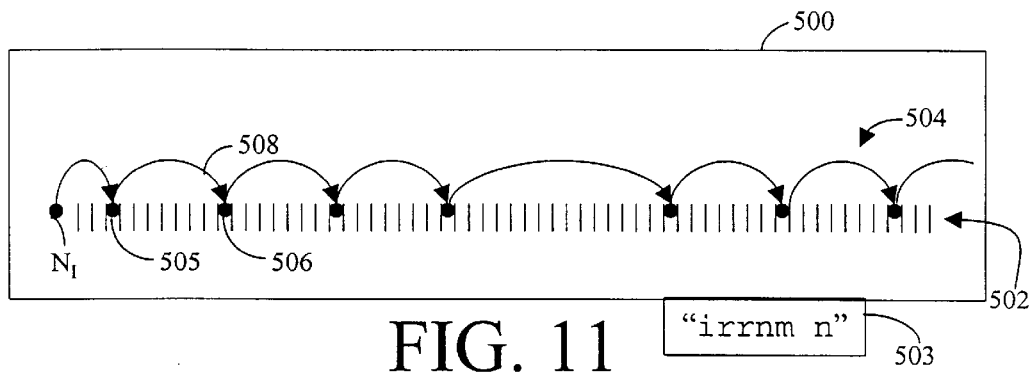
FIG. 11 schematically illustrates the decoding graph of FIG. 8 and shows a path through the graph that results from the illustrated embodiment of the best path search operation illustrated in the flowchart of FIG. 9.
Figure 12:
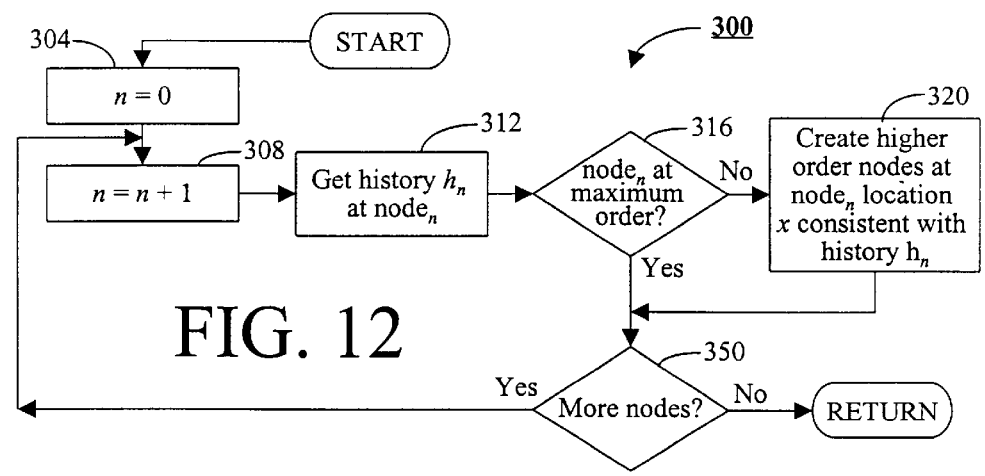
FIG. 12 is a flowchart illustrating the major functions of the post-line-decoding network expansion operation of FIG. 6 for expanding the decoding graph of FIG. 8 in order to accommodate a stochastic language model, according to an illustrated embodiment of the present invention.

FIG. 11 shows the hypothetical results of an iteration of best path search operation 240 on image 10 (FIG. 2). In particular, FIG. 11 shows a portion of a representative path 504 through decoding graph 500, as represented by a sequence of nodes and branches between the nodes. Decoding operation 240 produced estimated best path 504 which in turn produced the transcription 503 having the message string "irrnm n". The processes of the network expansion operation 300 are illustrated in the flowchart of FIG. 12 and they will be explained in conjunction with the nodes of path 504 in FIG. 11 as shown in multi-level decoding graph 500 of FIG. 13.

Network expansion operation 300 processes each node in data structure 600 and so begins by initializing a loop control variable n to zero, in box 304. The nodes are typically processed in order of image location. Boxes 308 and 350 delimit the extent of the node processing loop. For each node, denoted as $node_n$, operation 300 gets the history h of $node_n$, in box 312, and uses the ismax (h) function to determine if $node_n$ is of maximum order, in box 316. If ismax (h) returns true then control passes to the test in box 350 to determine whether to continue processing more nodes. If $node_n$ is not of maximum order (ismax (h) returns false), then control passes to box 320 where at least one new, higher order node is created in data structure 600. This new, higher order node may be referred to as a "context node", and its associated incoming branch may be referred to as a "context branch". The node data structure for the context node has the data indicated in Table 1.

TABLE 1

| Data Field | Same data as $node_n$ | New data |
| --- | --- | --- |
| Node text line x location | Yes | |
| Node history | | $node_n$ history plus character on best incoming branch |
| Node order | | $node_n$ order + 1 |
| Best incoming branch (back pointer) | Yes | |
| Character of best incoming branch | Yes | |
| Cumulative path score | Yes | |
| Best outgoing branch | Yes | |
| Pointer to next node at this location | Yes | |

In addition, the context node must have an edge score computed and stored for the incoming branch associated with it. The edge score for the context branch includes the same template-image matching score, matchscore (x, c), for $\text{node}_n$, plus an updated language model weight produced using function q(h, c), where h is the history associated with the new higher order node, and c is the character of the best incoming branch for the new higher order node. Note that this language model score may be either an upper bound score, if the context node is not of maximum order, or a language model weight, if the context node is of maximum order. From an implementation perspective, as noted earlier, if the computation is not excessive, all q function values that are needed may be computed in advance and stored in a table.

Figure 13:
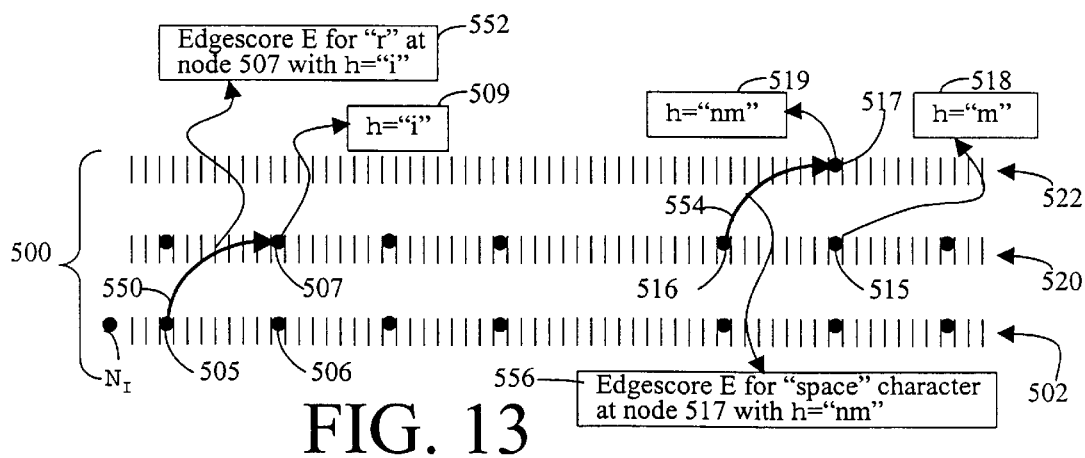
FIG. 13 schematically illustrates the expansion of nodes and branches in the decoding graph of FIG. 11, according to the flowchart of FIG. 12.

FIG. 13 schematically shows the network expansion process. Given the portion of path 504 of zero-order nodes shown in FIG. 11, network expansion operation 300 would result in first-order nodes being created for every zero-node. For example, zero-order node 506 would produce first-order node 507 at the same x location as node 506. With reference to transcription 503 in FIG. 11, node 507 would have a history h of "i". The best incoming branch to node 506 has the character "r" associated with it, and so the best incoming branch to node 507 is branch 550 also with character "r" associated with it. If not previously computed, operation 320 also computes the edge score 552 associated with branch 550, which includes the template-image matching score for the character "r" at location 506 plus the language model score produced by function q(h, c), which would be the result of q("i", "r").

FIG. 13 also shows the expansion of decoding graph 500 from a first-order node 515 to a second-order node 517. Suppose when processing node 515, the test using the ismax (h) function in box 316 (FIG. 12) returns false indicating that node 515 is not of maximum order. Processing control then passes to box 320 where a new higher order node is created at the same x location. With reference to transcription 503 in FIG. 11, node 515 has a history h of "m", as shown in box 518, and so node 517 would have a history h of "nm", as shown in box 519. The best incoming branch to node 515 has the space character associated with it, and so the best incoming branch to node 517 is branch 554 also with the space character associated with it. Again, if not previously computed, operation 320 also computes the edge score 556 associated with branch 554, which includes the template-image matching score for the space character at location 515 plus the language model score produced by function q(h, c), which would be the result of q("nm", " ") where " " signifies the space character.

Note that operation 320 of network expansion operation 300 must create at least one higher order node at the current x location of $\text{node}_n$, but may create more than one higher order node at the same time, up to the maximum order for the language model being used. So, for example, if the language model allows, nodes 515 and 517 shown in FIG. 13 could be created during the same pass of network expansion operation 300. There are advantages and disadvantages to adding more than one higher order node during the same pass of network expansion operation 300.

Adding multiple higher order nodes at once may allow determining the right path more quickly, but such a determination would amount to a guess. To be certain that the path through the network is the best path, i.e., actually generates the highest maximum cumulative score, requires a process of considering and eliminating other candidate paths. Because of the need to rule out other paths, the process of adding in higher order nodes all at once may actually slow the search down, as it may be that paths that will be ruled out could have been ruled out even when its nodes are of low order. In that case, adding higher order nodes for those paths would be unnecessary. Empirical observation of how operation 200 performs is likely to provide information as to how to determine whether to add only one higher node at a time, to add all higher order nodes, or to add some intermediate number of nodes, perhaps based on how many iterations have gone by.

Network expansion operation 300 illustrates that decoding graph data structure 500 is expanded with new context nodes and context transitions in an incremental fashion only after each decoding iteration, and in a selective and controlled manner only for portions of the data structure that are likely to include the best path indicating the final transcription. There will be entire portions of the graph that will never be expanded because they do not contain any part of the best path indicating the transcription of the text line image. This is contrasts with and is an improvement over previous techniques for accommodating a language model that required that the graph data structure show complete contexts for all possible paths.

With respect to the computational complexity and memory requirements of this technique for incorporating an N-gram language model, if B is the base graph size, without the language model, then it will expand by at most a factor of N for each iteration. Total graph size will be O(BNI), where I is the number of iterations. This is in effect a very pessimistic bound since many "best paths" will likely be similar to earlier paths, and so will not require as much graph expansion. The factor M, the number of templates, figures in the base graph size B=O(MX), where X is the number of positions along the line.

5. Implementation Details a. The Language Model Edge Score Component for the Decoding Graph Represents a "Degree of Validity" of the Character Sequence in the Language There are alternative ways to use the full conditional probabilities generated by the language model in the edge scores. Sometimes it will be desirable to weight the language model component of the edge score on a branch differently from the likelihood (image-match) component. Recall that these are logarithmic quantities. Suppose at a given node ismax (h) is true, so that the full conditional probability (rather than the upper bound score) is available from the q function. If this full conditional probability is denoted as P and the match score is denoted as M, then the edge score of the branch into that node may be defined as $\log M + \alpha \log P$, where the quantity a alpha functions as a weight on the full conditional probability generated by the language model. This would be desirable, for example, if it were known that the image is very noisy in a particular region, so that the language model component should be relied on more heavily. Also consider the quantity $P' = P^\alpha$. The branch edge score can then be written as $\log M + \log P'$, where the full conditional probability P is unweighted but raised to the power of some quantity $\alpha$.

In each of these cases, language model 62 (the q function) could return the desired quantity, P' or $\alpha$P, directly. Note that P' is not necessarily a probability distribution, as it will not generally sum to one, even if the full conditional probability distribution P did. Thus, it is not always strict requirement that the language model return a valid probability distribution when ismax (h) is true. Thus, although the term "probability" is used, the language model component of the edge scores in the decoding graph specifies more generally a "degree of validity" in the language of the text being decoded.

b. Testing for a Stopping Condition

It was noted above in the discussion accompanying FIG. 6 that the end condition tested in box 298 was whether all nodes in the current estimated best path produced by the most recent iteration of best path search 240 are of maximum order. This test involves invoking the ismax(h) function for each node and receiving true returned for each node. This stopping condition is premised on the requirement that all incoming branches to each node must have attached to them a language model weight generated by the language model. This requirement ensures that the maximum cumulative path scores have been found for each node in the correct and final best path through the image network. The concept of creating nodes of successively higher orders simply provides a mechanism for attaching successively improved language model scores to incoming branches until the language model weight is generated by the q function.

This stopping condition, however, is premised on an assumed restriction on the behavior of the language model being used. The N-gram language model satisfies this restriction. For a node of order n to be reachable, there must be an incoming branch from a node of order no less than n−1. Thus, the restriction on the language model is that the length of the history it deems significant to result in ismax (h) being true, grow no faster than one character per position in the string. For example, when N=4, the N-gram model looks back at most three characters in any text position x to produce true probabilities. Since the conditioning history deemed significant for such a model does not grow at all, it satisfies the condition of growing no faster than one character per position, and the N-gram model is therefore compatible with the premise of the stopping condition.

When using the "all nodes at maximum order" test, if one or more nodes along the current best path is not of maximum order, then best path search operation 240 will not terminate. It will instead iterate further under the assumption that network expansion operation 300 will create higher-order nodes in those locations that are not of maximum order until at last all nodes along the best path are of maximum order. However, at any given location, best path search operation 240 cannot reach a node of order more than one higher than the order of a predecessor node. Therefore, although nodes of higher order may have been created, they won't necessarily be reached, and instead the previous best-path will be found again. Using an alternative stopping criterion of saving the last path and testing to see if the same current path occurs twice is also not an effective stopping criterion, since the nodes that are not of maximum order still have upper bound scores, and not language model weights, attached to the branches going into them.

Thus, in the most general case, there are some reasonable stochastic language models that may be used in decoding for which having all nodes in the best path at maximum order may not be the appropriate stopping condition. An example of a reasonable language model that doesn't satisfy the implied restriction is one which, for a given x position on the text line, the language model may need to look back some unpredictable number of characters to determines the appropriate probability at a location x. For example, a language model that determines the probability of the ending of a second word based on whether the first, or previous, word was a verb needs to look back to the first word to see if it is a verb, but only in the context of making a determination about the ending of the second word and not when processing the first part of the second word.

c. Handling Character Spaces and Fine Spacing in the Image Model During Decoding The image model of the present invention accommodates the placement of character spaces on the text line, such as the space needed between words. Language models also make use of these "linguistic" spaces. The image model may also make use of single-pixel transitions that allow for fine horizontal line spacing. See, for example, image model 800 of FIG. 16, discussed in detail in Section 6 below. In that model, the attributes of transition 802 allow for the addition of a small amount of spacing (i.e., one pixel at a time) between character templates along the horizontal text line, in order to facilitate the actual matching of character images with templates. Transition 804 allows for the placement of a full space along the horizontal text line. Since full spaces are accommodated in the language model, they are treated like any other character during decoding.

Fine (e.g., single pixel) spacing, however, requires additional processing functions. Single pixel spacing is assumed to have no linguistic context in the language model, and represent only a translation in the x location along the text line. When a $node_n$ having a single pixel space associated with its best incoming transition is encountered in a candidate best path, at least one higher order node for $node_n$ is created, as shown in FIG. 12, but data structure 600 (FIG. 7) is updated in a different manner. The node history 604, best incoming branch data item 608 and data item 612 (the character of best incoming-branch) are given the node history of the immediately preceding node. With reference to FIG. 11 and FIG. 13, suppose by way of example, the first "r" character in path 504 at node 506 is followed by two single space transitions and is then followed by the second "r" character. When the nodes for these single space transitions are processed in operation 300, data structure 600 is updated to include a higher order node at each of these two locations. The node history 604, best incoming branch data item 608 and data item 612 (the character of best incoming-branch) are given the same data values as the immediately preceding node having the same order as the node being created. In addition, the language model score component of the edge score associated with single pixel space nodes is chosen to be small and constant, to penalize the use of many multiple thin spaces instead of word spaces.

d. Using Stochastic Language Models with Upper Bound Template-image Matching Scoring The present invention may be, but is not required to be, implemented in conjunction with the invention disclosed in the concurrently filed Heuristic Scoring disclosure. The techniques in the Heuristic Scoring disclosure involve initially using column-based, upper-bound template-image scores in place of the actual template-image matching scores computed using the matchscore (x, c) function. Actual template-image matching scores are computed only as needed. The upper bound scores are computationally simpler to compute than actual matching scores and, because they are true upper bound scores, are guaranteed to provide the same results as if the decoding operation had used all actual scores. Implementing the upper bound scoring techniques disclosed therein would require adding the post-line-decoding tasks specified in Section 5 of that application to post-line-decoding network expansion operation 300 herein.

If upper-bound template image matching scores are used in a decoding implementation in conjunction with the techniques of the present invention, several alternative decoding implementations are available. These alternative decoding implementations include:

(1) Use exact template-image matching scores and upper bound scores as the language model scores, with one set of decoding iterations, as described above in conjunction with the illustrated implementation of FIG. 6;

(2) Use upper bound template-image matching scores and upper bound scores as the language model scores, with two sets of decoding iterations. The first set of decoding iterations re-scores the upper bound template-image matching scores only, and uses the upper bound scores as the language model scores until the best candidate path emerges. The second set of decoding iterations starts with this best candidate path input to network expansion operation 300, and then iterates decoding from that point until the stopping condition is met.

(3) Use both upper bound template-image matching scores and upper bound scores as the language model scores, with only one set of decoding iterations. Network expansion operation 300 would then need to include the post-line decoding tasks described in the concurrently filed Heuristic Scoring disclosure in order to compute actual template image matching scores.

6. Overview of a Stochastic Finite State Network Text Line Decoder

The efficient incorporation of a language model into an image network according to the inventive techniques herein may be used in implementations of DID that use stochastic finite-state networks that model a full page of text. In those implementations, the decoding technique may be incorporated as part of the decoding of individual text lines during the decoding of the full document page. The reader is directed to the '773 DID patent and to the '444 ICP patent at cols. 5–7 and the description accompanying FIGS. 15–18 therein for the description and operation of a Markov source model for a class of 2D document images. Additional description may also be found in U.S. Pat. No. 5,689,620, at col. 36–40 and the description accompanying FIG. 14 at col. 39–40 therein.

The inventive technique may also be used in image recognition systems in which the stochastic finite-state network models only a single line of text. Such a model is illustrated by way of example as image source model 800 in FIG. 16. A brief review of the characteristics, attributes and operation of image source model 800 is provided here for convenience.

Image source model 800 is a simple source model for the class of document images that show a single line of English text in 12 pt. Adobe Times Roman font. A single text line model in this context is referred to as a one-dimensional model, in contrast to a document model that describes a full page of text, which is referred to in this context as a two-dimensional model. In model 800, documents consist of a single horizontal text line composed of a sequence of typeset upper- and lower-case symbols (i.e., letter characters, numbers and special characters in 12 pt. Adobe Times Roman font) that are included in the alphabet used by the English language. The image coordinate system used with the class of images defined by model 800 is one where horizontal movement, represented by x, increases to the right, and there is no vertical movement in the model. The left edge of the image is at x=0, and the right edge of the image is at x=W, where W indicates the width of the image in pixels. Text line image portion 10 of FIG. 2 is assumed to be an image in the class of documents described by Markov source 800, having dimensions W x H with an origin at the upper left corner where y=x=0 in an x, y coordinate system.

Markov source model 800 has initial state node $n_I$, "printing" state node $n_1$, and final state $n_F$. At node $n_1$ there are three different types of transitions indicated by loops 802, 804 and 806, with each transition shown labeled with its attributes. The attributes of transition 802 include a probability (0.4) and a horizontal displacement of 1 pixel. This transition allows for the addition of a small amount of spacing (i.e., one pixel at a time) between character templates along the horizontal text line. Transition 804 allows for the placement of a full space along the horizontal text line. The attributes of transition 804 include a probability of 0.4, the label 805 for the space character, and a horizontal displacement along the horizontal text line of set width $W_s$. Finally, the group of self-transitions 806 accommodates all of the character templates included in model 800. The attributes of each transition $t_m$ of transition group 806 include a probability based on the total number, m, of character templates Q, the character label 30 associated with an individual template 20, and a horizontal displacement $W_m$ along the horizontal text line indicating the set width 807 of the character template.

Markov source model 800 of FIG. 16 serves as an input to an image synthesizer in the DID framework. For an ordered sequence of characters in an input message string in the English language, the image synthesizer generates a single line of text by placing templates in positions in the text line image that are specified by model 800. The operation of text column source model 800 as an image synthesizer may be explained in terms of an imager automaton that moves over the image plane under control of the source model. The movement of the automaton constitutes its path, and, in the case of model 800, follows the assumptions indicated above for the conventional reading order for a single line of text in the English language.

From the initial state at node $n_I$ at the left edge of the image, the imager automaton transitions to node $n_1$ in preparation for placing character templates at the beginning of a horizontal text line. The imager proceeds through iterations of the self-transitions at node $n_1$ horizontally from left to right, through transitions 802, 804 and 806. The imager moves to the right by a displacement of 1 pixel at a time through transition 802 to introduce fine spacing on the text line. The imager moves to the right by the displacement $W_s$ through transition 804 to introduce a space on the text line. The imager places a character template 20 on the text line and then moves through transition 806 by the set width 807 of the template to the next position on the line. The imager moves along the text line until there are no more characters to be printed on the line or until the imager has reached the right end of the line, when the imager transitions to the final node nF. Decoding a text line image produced by the imager of model 800 involves finding the most likely path through model 800 that produced the text line.

Note that text line document image decoding using a Markov source of the type just described may be implemented using conventional image processing methods to locate the baselines of the text lines. After an input image has been de-skewed and text blocks and text lines have been identified, text line baselines can be identified using horizontal pixel projections of the text line. One such method includes the following steps: compute the horizontal pixel projection array for the image region containing the text line, and derive from this array an array including entries for the differential of the scan line sums, where the i-th entry in this array is the difference between the number of pixels in the i-th row and i+1-th row. Assuming the convention that the pixel rows are numbered from top to bottom, the baselines are easily observed as a negative spike in the differential scan line sums. The row identified as the baseline can then be used as the row at which the dynamic programming operation takes place. More information on this method of locating baselines may be found in reference [9].

7. The Machine and Software Product of the Invention

Figure 17:
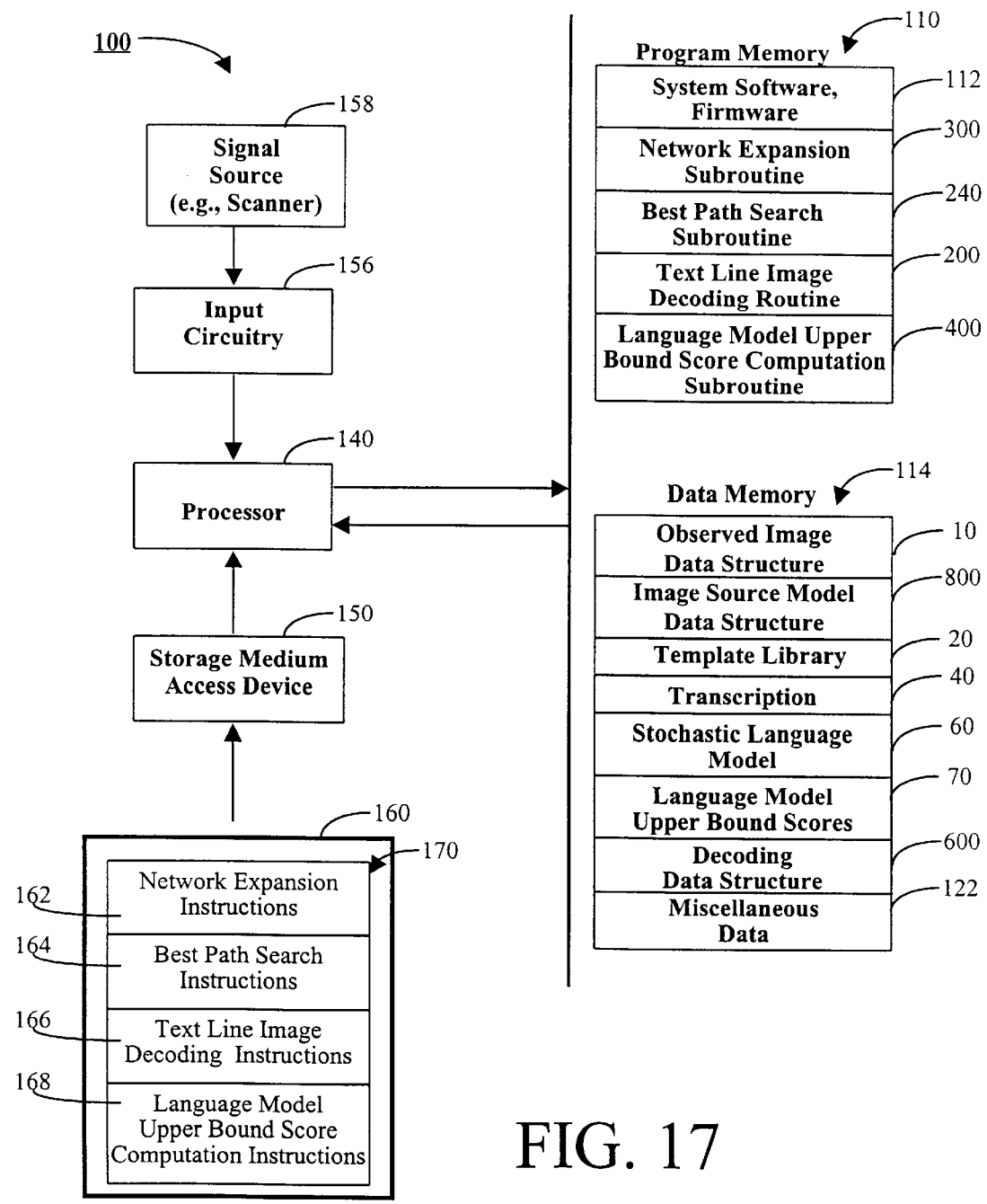
FIG. 17 is a simplified block diagram illustrating a suitably configured machine in which the present invention may be used, and further illustrating the software product of the present invention and its use in conjunction with the machine.

FIG. 17 is a block diagram of a generalized, processor-controlled machine 100; the present invention may be used in any machine having the common components, characteristics, and configuration of machine 100, and is not inherently related to any particular processor, machine, system or other apparatus. The machine or system may be specially constructed and optimized for the purpose of carrying out the invention. Alternatively, machine 100 may comprise a general-purpose computer selectively activated or reconfigured by a computer program stored in the computer. In still another alternative machine 100 may be a combination of a general-purpose computer and auxiliary special purpose hardware. When a machine such as machine 100 is suitably programmed to embody the present invention, the machine is not a standard or known configuration.

Machine 100 may be configured to perform text line image decoding operation 200 of FIG. 6 to perform iterated text line image decoding using language model scores. An input observed image, such as the image represented by image portion 10 of FIG. 2, is provided from signal source 158. Signal source 158 may be an image scanner, a memory device, a communications channel, a data bus, another processor performing an operation, or any other suitable source of bitmapped image signals. For example, signal source 158 may be an image capture device, such as a scanning device, a digital camera, or an interface device that produces a digital image definition data structure from another type of image signal. An input image provided by signal source 158 is forwarded via input circuitry 156 to processor 140 and may be stored in data memory 114. Machine 100 may, but need not, include a conventional display device (not shown) capable of presenting images, such as a cathode ray tube, a liquid crystal display (LCD) device, a printing device, or any other device suitable for presenting images.

Processor 140 operates by accessing program memory 110 to retrieve instructions, which it then executes. When machine 100 is configured to perform text line image decoding operation 200 of FIG. 6 to produce a transcription from an input text line image, program memory 110 includes decoding instructions that implement operations 400, 240 and 300 of FIG. 6. For example, program memory 110 includes subroutine 400 for computing the upper bound scores using the language model, as shown in FIG. 4, and subroutine 300 for performing the network expansion functions of FIG. 12.

During execution of the instructions, processor 140 may access data memory 114 to obtain or store data necessary for performing its operations. For example, when machine 100 is configured to perform operation 200 of FIG. 6, processor 140 accesses template library 20, observed input image 10 and language model upper bound scores 70 in data memory 114 in order to perform operation 200. Processor 140 stores data structure 600 indicating the decoding graph 500 in data memory 114 during iterations of the text line decoding operation. Processor 140 may also store the output transcription 40 of a decoded text line. Data memory 114 also stores a stochastic finite state network that represents an image source model, such as the line image source 800 of FIG. 16. Data memory 114 also stores various other miscellaneous data 122 such as template-image matching scores and other data used by best path search subroutine 240.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility (not shown.) Machine 100 may also include a user-controlled input signal device (not shown) for sending signals to processor 140 to initiate the operations of FIG. 6 for an input image 10. Such an input device may be connect to processor 140 by way of a wire, wireless or network connection.

FIG. 17 also shows software product 160, an article of manufacture that can be used in a machine that includes components like those shown in machine 100. Software product 160 includes data storage medium 170 that can be accessed by storage medium access circuitry 150. Data storage medium 170 stores instructions for executing operation 200 of FIG. 6. Software product 160 may be commercially available to a consumer in the form of a shrink-wrap package that includes data storage medium 170 and appropriate documentation describing the product. In that case, a data storage medium is a physical medium that stores instruction data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. "Storage medium access circuitry" is circuitry that can access data on a data storage medium. Storage medium access circuitry 150 may be contained in a distinct physical device into which data storage medium 170 is inserted in order for the storage medium access circuitry to access the data stored thereon. Examples of storage medium access devices include disk drives, CD-ROM readers, and DVD devices. These may be physically separate devices from machine 100, or enclosed as part of a housing of machine 100 that includes other components.

Storage medium access circuitry 150 may also be incorporated as part of the functionality of machine 100, such as when storage medium access circuitry includes communications access software and circuitry in order to access the instruction data on data storage medium 170 when data storage medium 170 is stored as part of a remotely-located storage device, such as a server. Software product 160 may be commercially or otherwise available to a user in the form of a data stream indicating instruction data for performing the method of the present invention that is transmitted to the user over a communications facility from the remotely-located storage device. In the latter case, article 160 is embodied in physical form as signals stored on the remotely-located storage device; the user purchases or accesses a copy of the contents of data storage medium 170 containing instructions for performing the present invention, but typically does not purchase or acquire any rights in the actual remotely-located storage device. When software product 160 is provided in the form of a data stream transmitted to the user over a communications facility from the remotely-located storage device, instruction data stored on data storage medium 170 is accessible using storage medium access circuitry 150. Alternatively, a data stream transmitted to the user over a communications facility from the remotely-located storage device may be stored in some suitable local memory device of machine 100, which might be program memory 110, or a data storage medium locally accessible to machine 100 (not shown), which would then also be accessible using storage medium access circuitry 150.

FIG. 17 shows data storage medium 170 configured for storing instruction data for performing operation 200 (FIG. 6). This instruction data is provided to processor 140 for execution when text line decoding using a language model is to be performed. The stored data includes language model upper bound score computation instructions 168, best path search instructions 164, text line image decoding subroutine instructions 166 and network expansion instructions 162. When these instructions are provided to processor 140, and processor 140 executes them, the machine is operated to perform the operations for iteratively decoding a text line image using a language model, according to the operations of FIG. 4, FIG. 6, FIG. 9 and FIG. 12. For example, when language model upper bound score computation instructions 168 are provided to processor 140, processor 140 executes them, causing the machine to perform the operations described in conjunction with FIG. 4 for computing upper bound scores for use in the decoding graph during best path search operation 240. When text line image decoding instructions 166 are provided to processor 140, and processor 140 executes them, the machine is operated to perform the operations for decoding a text line image, as represented by the flowchart of FIG. 6. When best path search instructions 166 are provided to processor 140, and processor 140 executes them, the machine is operated to perform the operations for producing a candidate best path through decoding graph 500, as represented by the flowchart of FIG. 9. When network expansion instructions 162 are provided to processor 140, and processor 140 executes them, the machine is operated to perform operations for creating higher order nodes, as represented in the flowchart of FIG. 12.

Implementation of the present invention as part of the Document Image Decoding text recognition system requires familiarity with the details of DID as disclosed in U.S. Pat. Nos. 5,321,773 and 5,526,444, and in references [2], [3] and [3] noted in the Appendix of Referenced Documents that follows below. Those references, in turn, presume an understanding of probability and decision theory as they relate to pattern-matching problems, and presume further a working knowledge and familiarity with the implementation of hidden Markov models for modeling the occurrence of a sequence of observable symbols. This knowledge is available from a number of texts and articles on these subjects, including the texts and articles by Huang et al. and Rabiner et al. listed as Other Publications in U.S. Pat. No. 5,689,620 and referenced therein at col. 35. The reader is directed to these references if further information is needed in order to implement the present invention in conjunction with the DID text recognition system.

While the invention has been described in conjunction with one or more specific embodiments, this description is not intended to limit the invention in any way. Accordingly, the invention as described herein is intended to embrace all modifications and variations that are apparent to those skilled in the art and that fall within the scope of the appended claims.

APPENDIX OF REFERENCED DOCUMENTS

[1] C. B. Bose and S. Kuo, "Connected and Degraded Text Recognition Using A Hidden Markov Model," 11$^{th}$ *International Conference on Pattern Recognition,* The Hague Netherlands, September 1992.

[2] P. Chou and G. Kopec, "A Stochastic Attribute Grammar Model Of Document Production And Its Use In Document Recognition," *First International Workshop on Principles of Document Processing,* Washington, D.C., Oct. 21–23, 1992.

[3] G. Kopec, "Row-Major Scheduling Of Image Decoders," *Technical Report* P92-0006 (EDL-92-5), Xerox Palo Alto Research Center, Palo Alto, Calif., June 1992.

[4] G. Kopec and P. Chou, "Document Image Decoding Using Markov Source Models, *IEEE Transactions on Pattern Analysis and Machine Intelligence,* Vol. 16, No. 6, June 1994, pp. 602–617.

[5] A. Kam and G. Kopec, "Document image decoding by heuristic search," *IEEE Transactions on Pattern Analysis and Machine Intelligence,* Vol. 18, No. 9, September 1996, pp. 945–950.

[6] E. M. Riseman and A. R. Hanson, "A Contextual Postprocessing System for Error Correction Using Binary n-Grams," *IEEE Transactions on Computers,* May 1974, pp. 480–493.

[7] J. R. Ullman, "A Binary n-Gram Technique for Automatic Correction of Substitution, Deletion, Insertion and Reversal Errors in Words," *The Computer Journal,* 1977, pp. 141–147.

[8] J. J. Hull and S. N. Srihari, "Experiments in Text Recognition with Binary n-Gram and Viterbi Algorithms," *IEEE Transactions on Pattern Analysis and Machine Intelligence,* September 1992, pp. 520–530.

[9] F. R. Chen, D. S. Bloomberg, and L. D. Wilcox, "Spotting phrases in lines of imaged text", *Proceedings of SPIE, Document Recognition II,* Vol. 2422, February 1995, pp. 256–269.

What is claimed is:

1. A method for operating a processor-controlled machine to perform a decoding operation to decode a text line image using a language model; the method comprising the steps of:

receiving an input text line image including a plurality of image glyphs each indicating a character symbol;

representing the input text line image as an image network data structure indicating a plurality of nodes and branches between nodes; each node indicating a location of an image glyph; each branch leading into a node being associated with a character symbol identifying the image glyph; the plurality of nodes and branches indicating a plurality of possible paths through the image network; each path indicating a possible transcription of the input text line image;

assigning a language model score computed from a language model to each branch in the image network according to the character symbol associated with the branch; the language model score indicating a validity measurement for a character symbol sequence ending with the character symbol associated with the branch;

performing a repeated sequence of a best path search operation followed by a network expansion operation until a stopping condition is met;

the best path search operation producing a complete path of branches and nodes through the image network using the language model scores assigned to the branches;

the network expansion operation including adding at least one context node and context branch to the image network; the context node having a character history associated therewith; the context branch indicating an updated language model score for the character history ending with the character symbol associated with the context branch; the image network with the context node and context branch added thereto being available to a subsequent execution of the best path search operation; and when the stopping condition is met, producing the transcription of the character symbols represented by the image glyphs of the input text line image using the character symbols associated with the branches of the complete path.

2. The method of claim 1 for operating a processor-controlled machine to decode a text line image using a language model wherein the language model score and the updated language model score indicate probabilities of occurrence of a character symbol sequence in a language modeled by the language model.

3. The method of claim 1 for operating a processor-controlled machine to decode a text line image using a language model wherein the language model score is an upper bound score on the validity measurement for the character symbol sequence ending with the character symbol associated with the branch; and wherein, when the language model produces the updated language model score for the character history ending with the character symbol associated with the context branch, the updated language model score replaces the upper bound score.

4. The method of claim 3 wherein the upper bound score is a strict upper bound measurement of the validity of the character symbol sequence ending with the character symbol associated with the branch; the strict upper bound measurement being computed using all possible character symbol sequences of N−1 character symbols preceding the selected character symbol represented in the image network.

5. The method of claim 3 wherein the upper bound score is an approximate upper bound measurement of the validity of the character symbol sequence ending with the character symbol associated with the branch.

6. The method of claim 1 for operating a processor-controlled machine to decode a text line image using a language model wherein the language model is a stochastic N-gram language model indicating a language model weight for a selected character symbol, v, given a sequence of N−1 character symbols preceding the selected character symbol; and the language model score is an upper bound score computed from an upper bound function using the stochastic language model; the upper bound function producing an upper bound on the language model score using all possible character symbol sequences of N−1 character symbols preceding the selected character symbol represented in the image network.

7. The method of claim 6 for operating a processor-controlled machine wherein the upper bound function is defined as $$q(v_k|B) = \max_A P(v_k|AB),$$

where q is the upper bound score, B is the sequence of j preceding character symbols, $0 \leq j \leq N-1$, and A ranges over all (N−j−1)-long sequences of characters.

8. The method of claim 1 for operating a processor-controlled machine to decode a text line image using a language model wherein each node in the image network data structure has a node order determined by a history string length of the character history associated therewith; and the network expansion operation adds a context node for every node in the complete path having a node order less than a maximum order; the context node having a node order one higher than the node order of the node from which the context node is created.

9. The method of claim 8 for operating a processor-controlled machine wherein the stopping condition is met when each node in the complete path produced by the best path search operation is of maximum order.

10. The method of claim 1 for operating a processor-controlled machine to decode a text line image using a language model wherein the best path search operation is a dynamic programming procedure; the dynamic programming procedure using a set of likelihood functions combined with the language model scores to compute the most likely path into each node at each image point in the image network.

11. The method of claim 1 for operating a processor-controlled machine to decode a text line image using a language model wherein producing the complete path of nodes and branches includes computing maximum cumulative path scores at image positions in the image network using the language model scores for the character symbols assigned by the language model to the branches; the best path search operation maximizing the cumulative path score at each image position.

12. The method of claim 11 wherein each node in the image network data structure has a node order determined by a history string length of the character history associated therewith;

the network expansion operation adds a context node for every node in the complete path having a node order less than a maximum order; the context node having a node order one higher than the node order of the node from which the context node is created; the context node having a text line image location identical to the text line image position of the node from which the context node is created; and computing maximum cumulative path scores by the best path search operation includes, at each image position in the text line image and for each possible character symbol and for each node and context node at each image position, computing a next image position for the character symbol in the text line image;

computing a cumulative path score for a path including an incoming branch to a highest order node at the next image position;

comparing the cumulative path score to a prior maximum cumulative path score for the highest order node at the next image position to determine an updated maximum cumulative path score for the next image position; and storing the updated maximum cumulative path score with the highest order node at the next image position.

13. The method of claim 1 for operating a processor-controlled machine to decode a text line image using a language model wherein the image network includes a plurality of character templates and character labels; each character template indicating a bitmapped image of a character symbol and a character label identifying the character symbol represented by the character template; and the best path search operation further includes computing a plurality of matching scores each indicating a measurement of a match between one of the plurality of character templates and a two-dimensional region of the input text line image; and
computing maximum cumulative path scores at image positions in the image network using the matching scores and the language model scores for the character symbols assigned by the language model to the branches; the best path search operation using the maximum cumulative path scores to produce the complete path.

14. The method of claim 1 for operating a processor-controlled machine to decode a text line image using a language model wherein the image network data structure is a stochastic finite state image network that models an expected spatial arrangement of character symbols in the input text line image as a regular grammar.

15. The method of claim 14 for operating a processor-controlled machine wherein stochastic finite state image network is a Markov source.

16. In an image recognition computer-implemented method for analyzing a bitmap text line image into a combination of character symbol templates selected from a library of templates on the basis of at least one complete path computed through a decoding graph of a Markov source, the improvement comprising:

assigning a language model score computed from a language model to each transition in the decoding graph according to a character symbol associated with the transition; the language model score indicating a validity measurement for a character symbol sequence ending with the character symbol associated with the branch; and performing a repeated sequence of a best path search operation followed by a network expansion operation until a stopping condition is met; the best path search operation producing a complete path of nodes and transitions through the decoding graph using the language model scores assigned to the transitions; the network expansion operation producing an expanded decoding graph including a context node for each node included in the complete path; the network expansion operation assigning to a transition incoming to a context node an updated language model score, computed from the language model, for a sequence of character symbols ending with a character symbol associated with the incoming transition; the expanded decoding graph being available to subsequent executions of the best path search operation.

17. An article of manufacture for use in a machine that includes a memory device for storing data; a storage medium access device for accessing a medium that stores data; and a processor connected for accessing the data stored in the memory device and for receiving data from the storage medium access device; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, receiving an input text line image including a plurality of image glyphs each indicating a character symbol;

the processor, further in executing the instructions, representing the input text line image as an image network data structure indicating a plurality of nodes and branches between nodes; each node indicating a location of an image glyph; each branch leading into a node being associated with a character symbol identifying the image glyph; the plurality of nodes and branches indicating a plurality of possible paths through the image network; each path indicating a possible transcription of the input text line image;

the processor, still further in executing the instructions, assigning a language model score computed from a language model to each branch in the image network according to the character symbol associated with the branch; the language model score indicating a validity measurement for a character symbol sequence ending with the character symbol associated with the branch;

the processor, further in executing the instructions, performing a repeated sequence of a best path search operation followed by a network expansion operation until a stopping condition is met;

the best path search operation producing a complete path of nodes and branches between nodes through the image network using the language model scores for the character symbols assigned to the branches;

the network expansion operation including adding at least one context node and context branch to the image network; the context node having a character history associated therewith; the context branch indicating an updated language model score for the character history ending with the character symbol associated with the context branch; the image network with the context node and context branch added thereto being available to a subsequent execution of the best path search operation; and the processor, still further in executing the instructions, when the stopping condition is met, producing the transcription of the character symbols represented by the image glyphs of the input text line image using the character symbols associated with the branches of the complete path.

18. The article of claim 17 wherein the language model score and the updated language model score indicate probabilities of occurrence of a character symbol sequence in a language modeled by the language model.

19. The article of claim 17 wherein the language model score is a strict upper bound score on the validity measurement for the character symbol sequence ending with the character symbol associated with the branch; the strict upper bound measurement being computed using all possible character symbol sequences of N-1 character symbols preceding the selected character symbol represented in the image network; and wherein, when the language model produces the updated language model score for the character history ending with the character symbol associated with the context branch, the updated language model score replaces the strict upper bound score.

20. The article of claim 17 wherein each node in the image network data structure has a node order determined by a history string length of the character history associated therewith; and wherein the processor, in executing the instruction for performing the network expansion operation, adds a context node for every node in the complete path having a node order less than a maximum order; the context node having a node order one higher than the node order of the node from which the context node is created; the context node having a text line image location identical to the text line image position of the node from which the context node is created; and the processor, in executing the instructions for computing maximum cumulative path scores, at each image position in the text line image and for each possible character symbol and for each node and context node at each image position, computes a next image position for the character symbol in the text line image;

computes a cumulative path score for a path including an incoming branch to a highest order node at the next image position;

compares the cumulative path score to a prior maximum cumulative path score for the highest order node at the next image position to determine an updated maximum cumulative path score for the next image position; and stores the updated maximum cumulative path score with the highest order node at the next image position.

* * * * *